(12) United States Patent
Dei et al.

(10) Patent No.: US 8,503,538 B2
(45) Date of Patent: Aug. 6, 2013

(54) METHOD, APPARATUS, SYSTEM, AND PROGRAM FOR CONTENT ENCODING, CONTENT DISTRIBUTION, AND CONTENT RECEPTION

(75) Inventors: Hiroaki Dei, Tokyo (JP); Daisuke Mizuno, Tokyo (JP); Kazunori Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 1583 days.

(21) Appl. No.: 10/587,752

(22) PCT Filed: Jan. 24, 2005

(86) PCT No.: PCT/JP2005/000831
§ 371 (c)(1),
(2), (4) Date: Jul. 28, 2006

(87) PCT Pub. No.: WO2005/074291
PCT Pub. Date: Aug. 11, 2005

(65) Prior Publication Data
US 2007/0177719 A1    Aug. 2, 2007

(30) Foreign Application Priority Data
Jan. 28, 2004  (JP) .................. 2004-020125

(51) Int. Cl.
| H04N 7/12 | (2006.01) |
| H04N 11/02 | (2006.01) |
| H04N 11/04 | (2006.01) |
| H04N 7/18 | (2006.01) |
| H04N 7/173 | (2011.01) |
| H04N 7/14 | (2006.01) |
| H04L 25/34 | (2006.01) |
| H04L 25/49 | (2006.01) |
| H04L 9/08 | (2006.01) |

(52) U.S. Cl.
USPC ........ 375/240.26; 380/282; 725/81; 725/105; 348/14.15; 370/217; 370/236

(58) Field of Classification Search
USPC .................................................. 375/240.26
See application file for complete search history.

(56) References Cited

U.S. PATENT DOCUMENTS

| 4,928,288 | A | * | 5/1990 | D'Aria et al. ................. 375/287 |
| 5,528,284 | A | * | 6/1996 | Iwami et al. ............... 348/14.15 |
| 5,708,961 | A | * | 1/1998 | Hylton et al. .................. 725/81 |
| 5,892,879 | A | | 4/1999 | Oshima et al. |
| 6,373,817 | B1 | * | 4/2002 | Kung et al. ..................... 370/217 |
| 6,415,031 | B1 | * | 7/2002 | Colligan et al. .............. 380/200 |
| 6,507,611 | B1 | | 1/2003 | Imai et al. |
| 6,535,717 | B1 | | 3/2003 | Matsushima et al. |
| 6,571,361 | B1 | * | 5/2003 | Kikuchi et al. ............... 714/701 |
| 6,745,364 | B2 | | 6/2004 | Bhatt et al. |
| 6,778,501 | B1 | * | 8/2004 | Malmgren et al. ............ 370/236 |
| 7,017,175 | B2 | * | 3/2006 | Alao et al. .................... 725/105 |
| 7,180,434 | B2 | | 2/2007 | Ozawa et al. |
| 7,260,060 | B1 | * | 8/2007 | Abaye et al. .................. 370/230 |
| 7,298,295 | B2 | | 11/2007 | Ozawa et al. |
| 2002/0003886 | A1 | * | 1/2002 | Hillegass et al. ............. 380/282 |
| 2003/0126238 | A1 | * | 7/2003 | Kohno et al. ................. 709/220 |
| 2003/0167472 | A1 | | 9/2003 | Barbanson et al. |
| 2004/0010614 | A1 | | 1/2004 | Mukherjee et al. |
| 2005/0111541 | A1 | | 5/2005 | Hatabu et al. |
| 2005/0117643 | A1 | | 6/2005 | Hatabu et al. |
| 2005/0226325 | A1 | | 10/2005 | Dei et al. |

FOREIGN PATENT DOCUMENTS

| EP | 1 239 619 | | 9/2002 |
| JP | 90-74559 | | 3/1997 |
| JP | 9-294264 | A | 11/1997 |
| JP | 10-117163 | A | 5/1998 |
| JP | 10-136379 | A | 5/1998 |
| JP | 2000-228765 | A | 8/2000 |
| JP | 2002-141964 | A | 5/2002 |
| JP | 2002-290973 | A | 10/2002 |
| JP | 2003-92564 | | 3/2003 |
| JP | 2003-229815 | A | 8/2003 |
| JP | 2003-235021 | | 8/2003 |
| JP | 2003-299095 | A | 10/2003 |
| JP | 2003-318851 | | * 11/2003 |
| JP | 2003-318851 | A | 11/2003 |
| WO | WO-93/20653 | | 10/1993 |
| WO | WO-03/084172 | | 10/2003 |

| WO | WO-03/092295 | 11/2003 |
| WO | WO-03/092296 | 11/2003 |
| WO | WO-03/092302 | 11/2003 |

OTHER PUBLICATIONS

Tudor, "MPEG-2 Video Compression", Electronics & Communication Engineering Journal, Dec. 1995.*
Walker et al., BT Technology Journal, vol. 21, No. 3, pp. 192-202 (2003).
Halvorsen et al., "Integrated Error Management for Media-on-Demand Services", Proceedings IEEE InfoCom 2001. The Conference on Computer Communications. 20th. Annual Joint Conference of the IEEE Computer and Communications Societies. Anchorage, AK, vol. 2, pp. 621-630 (Apr. 2001).
International Search Report for International Application No. PCT/JP2005/000831, date of mailing May 17, 2005.
Schulzrinne, H., Rao, A., Lanphier, R.; "Real Time Streaming Protocol (RTSP)"; RFC 2326, Apr. 1998, Internet URL address <http://www.ietf.org/rfc/rfc2326.txt> obtained from <http://www.ietf.org/>.
Handley, M., Jacobson, V.; "SDP: Session Description Protocol"; RFC 2327, Apr. 1998, Internet URL <http://www.ietf.org/rfc/rfc2327.txt> obtained from <http://www.ietf.org/>.
Schulzrinne, H., Casner, S., Frederick, R., and V. Jacobson; "RTP: A Transport Protocol for Real-Time Applications"; RFC 1889, Jan. 1996, 5.1 RTP Fixed Header Fields. Internet URL <http://www.ietf.org/rfc/rfc1889.txt.

* cited by examiner

*Primary Examiner* — Christopher S Kelley
*Assistant Examiner* — Hee-Yong Kim
(74) *Attorney, Agent, or Firm* — Dickstein Shapiro LLP

(57) ABSTRACT

There are provided a system, an apparatus, and a method for suppressing increase in an amount of distribution data when performing content distribution via a network, improving reliability of the data received by a receiver in the distribution through an unstable transmission path such as a wireless transmission path, enabling provision of the content with a stable quality, and realizing the provision of the content with an optimal quality for the reception environment of content receiver, while suppressing an increase in an amount of processing for improving reliability of the distribution data on both of reception side and a transmission side. A content distribution apparatus 101 includes first through Nth image encoded data transmitting units 105 to 107, and multiplexes a plurality of data in a predetermined layer in accordance with a scalable encoding system using a plurality of sessions or a same session, for transmission by providing a preset time difference for each of the data or interleaving the data. The content distribution apparatus 101 sets compression rates of second and subsequent data to be the same or higher than that of first data, suited to a state of the transmission path, thereby suppressing an increase in a band. A content receiving apparatus 111 includes first through Nth image encoded data receiving units 113 to 115, an encoded data reconstruction unit 116, and a decoder 117. The content receiving apparatus 111 selects encoded data based on the compression rate, for reconstruction, and decodes the reconstructed encoded data.

9 Claims, 27 Drawing Sheets

METHOD, APPARATUS, SYSTEM, AND PROGRAM FOR CONTENT ENCODING, CONTENT DISTRIBUTION, AND CONTENT RECEPTION

FIELD OF THE INVENTION

The present invention relates to a technology for content distribution via a network. More specifically, the invention relates to a method, an apparatus, and a program for performing transmission on a transmission path so as to have the tolerance for a data error and a data loss, a method for receiving encoded data, for decoding, an apparatus thereof, a system therefor, and a computer program therefor.

BACKGROUND OF THE INVENTION

Recently, the widespread use of the Internet makes content distribution more popular where content, including moving pictures and audios, is distributed and played back via an IP (Internet Protocol) network. In the distribution of this kind, in order to improve the transmission efficiency of for example moving pictures, highly efficient compression encoding scheme based on the inter-frame prediction is used in many cases. In those schemes, predictive parameters, acquired by predicting the encoded images from the temporally preceding and following frames, and predictive residual image data are encoded to reduce the amount information of temporally correlated moving picture data. In addition, the high compression and encoding of predictive residual image data through transform-coding and quantization enables content data to be transmitted using a small amount of transmission bandwidth.

Typical exemplary transmissions use compression and encoding schemes such as MPEG (Moving Picture Experts Group)-1, MPEG-2, and MPEG-4. In those compression encoding schemes, inter-frame prediction is performed for an input image frame for each fixed-size rectangular area, called a macro block, through motion compensation, and the obtained motion vectors and the signal data, generated by compressing the predictive residual image data through the two-dimensional discrete cosine transform and quantization, are variable-length coded.

Effective compression encoding schemes based on the inter-frame prediction, such as AAC (Advanced Audio Codec), are also available for audios to enable content distribution that uses the transmission bandwidth efficiently.

As a file format for recording these content data, the file format such as an MP4 file format or a 3GP file format is present. These can record a plurality of media, encoded data with a distribution rate (compression rate), and a distribution encoded data unit.

There are a lot of methods of distributing encoded data of such a content over an IP (Internet Protocol) network that uses a packet switching system. It is considered that this distribution will be expanded in the future to perform content distribution in a mobile communication system in which a mobile station constituted from a PHS (Personal Handyphone System), a cellular phone, or a portable terminal that uses these as communication means is connected to a wireless base station through a wireless channel.

Patent Document 1 described below discloses a configuration including N transmission means for converting audio data to N encoded data and transmitting the encoded data to M transmission paths at a constant interval or an adaptively changing time interval. In this configuration, selection of a transmission path is made by a selection unit and the encoded data is selected from among the encoded data that could be normally received, for reconstruction by an encoding data reconstruction unit.

Non-patent Document 1: Schulzrinne, H., Rao, A., Lanphier, R, "Real Time Streaming Protocol (RTSP)", RFC 2326, April 1998, Internet URL address <http://www.ietf.org/rfc/rfc2326.txt obtained from http://www.ietf.org/>

Non-patent Document 2: Handley, M., Jacobson, V., "SDP: Session Description Protocol", RFC 2327, April 1998, Internet URL <http://www.ietf.org/rfc/rfc2327.txt obtained from http://www.ietf.org/>

Non-patent Document 3: Schulzrinne, H., Casner, S., Frederick, R., and V. Jacobson, "RTP: A Transport Protocol for Real-Time Applications", RFC 1889, January 1996, 5.1 RTP Fixed Header Fields. Internet URL <http://www.ietf.org/rfc/rfc1889.txt obtained from http://www.ietf.org/>

Patent Document 1: JP Patent Kokai Publication No. JP-P-2003-318851A (Page Nos. 14 and 15, FIG. 1)

DISCLOSURE OF THE INVENTION

Problems to be Solved by the Invention

However, in a conventional content distribution method, when an error in transmission data having a long burst property that cannot be recovered even if an error correction code is employed or when a dropout of a transmission packet is generated, a reception side cannot decode data of content in which an error occurs, accurately.

It is a common practice to request resending of lost data when a packet loss is generated. However, in multicast/broadcast information distribution, it is impossible to use a method in which information on the error of the transmitted data or the dropout of the transmission packet is transmitted from the reception side to a transmission side.

There is an error concealment approach as a measure on the reception side for the occurrence of packet loss. In this approach, in case of image data, for example, the image data that makes an error as inconspicuous as possible is generated from data on images of temporarily preceding and subsequent frames and data on a surrounding image within the same frame that could be accurately decoded. In this technique, however, a disturbance in a decoded image cannot be eliminated. Further, since the inter-frame prediction is employed, a disturbance in an image or a sound, generated once would be propagated to a subsequent frame. In the case of audio data as well, an error concealment technique is present in which from preceding decoded audio data, data similar to audio data of a dropout frame is generated. In this method as well, degradation of a sound quality would be generated.

In addition, when error information is loop backed to the transmission side from the reception side, a band will also be occupied by this feedback information and resent data. This becomes a great problem on a transmission path such as a radio transmission path having limited network resources.

Further, if when a content is distributed, a rate conversion or generation of error tolerant code data is performed on individual streams, and especially if the number of distributions is large, a burden of processing on a distribution side would become extremely large.

Accordingly, a main object (a first object) of the present invention is to provide a method, an apparatus, a system, and a program for transmitting content data that suppresses a remarkable disturbance in quality of reproduced content on a reception side resulting from a transmission error of encoded data or a loss of the encoded data, as much as possible.

Other object of the present invention is to provide a method, an apparatus, a system, and a program in which a content distribution service provider can set a trade-off between a transmission band that can be used for content data transmission and quality.

Still other object of the present invention is to provide a method, an apparatus, a system, and a program that achieves the first object described above without sending feedback information from a reception side to a transmission side.

Still other object of the present invention is to provide a method, an apparatus, a system, and a program that achieves the first object while reducing an increase in a processing burden on a distribution side.

Still other object of the present invention is to provide a method, an apparatus, a system, and a program that can control quality and/or stability of content on a reception side by a transmission side by controlling presence or absence of encryption at a time of transmission and/or information to be notified to the reception side in call connection processing.

Still other object of the present invention is to provide a method, an apparatus, a system, and a program that controls quality or stability and/or stability of content received according to power that can be used on a reception side.

Still other object of the present invention is to provide a method, an apparatus, a system, and a program that achieve the objects described above while suppressing an increase in a computation amount required for decoding of compression encoded data.

Means for Solving the Problem

The invention disclosed in this application is generally configured as follows, as means for solving at least one of the problems described before.

In a content distribution system according to one aspect of the present invention, a transmission side includes:

means for reading at least one item of encoded data from a content file with M encoded data having different compression rates stored therein;

first through Nth encoded data transmission means; and means for setting routing priority control on a transmission path for each session and setting power control on a wireless transmission path, wherein M and N are integers equal to or greater than two. Respective encoded data transmission means transmit encoded data using mutually different sessions. A reception side includes:

means for receiving the encoded data from at least one session; and means for selecting whether to receive the encoded data from the at least one session based on an error and loss rate of the received data, and/or power that can be used by the reception side, and/or a setting set in advance. The encoded data received without a transmission error or a dropout is extracted, and reconstruction is performed, for decoding.

In a content distribution system according to other aspect of the present invention, a transmission side includes:

means for reading at least one item of encoded data from a content file with M encoded data having different compression rates stored therein;

first through Nth encoded data processing means; and means for multiplexing outputs of the first through Nth encoded data processing means for transmission, wherein M and N are integers equal to or greater than two. The transmission side transmits the multiplexed encoded data using at least one session. A reception side includes:

means for receiving the multiplexed encoded data from the at least one session. Then, the encoded data that has been received with no transmission error or no dropout is extracted, and reconstruction is performed, for decoding.

In a content distribution system according to other aspect of the present invention, a transmission side includes:

means for reading at least one item of encoded data and at least one Intra-frame encoded data from a content file with M encoded data having different compression rates stored therein;

first through Nth encoded data transmission means;

at least one Intra-frame encoded data transmission means; and means for setting routing priority control on a transmission path for each session and setting power control on a wireless transmission path, wherein M and N are integers equal to or greater than one. The respective transmission means transmit encoded data using mutually different sessions. A reception side includes:

means for receiving the encoded data and the Intra-frame encoded data from at least one of the sessions; and may further include:

means for selecting whether to receive the encoded data from the at least one of the sessions based on an error and loss ratio of the received data and/or power that can be used by the reception side and/or a setting set in advance. Then, the encoded data that has been received with no transmission error or no dropout is extracted, and reconstruction is performed, for decoding.

In a content distribution system according to other aspect of the present invention, a transmission side includes:

means for reading at least one item of encoded data and at least one Intra-frame encoded data from a content file with M encoded data having different compression rates stored therein;

first through Nth encoded data processing means;

at least one Intra-frame encoded data processing means; and means for multiplexing outputs of the first through Nth encoded data processing means and an output of Intra-frame encoded data, for transmission, wherein M and N are integers equal to or greater than one. The transmission side transmits the multiplexed encoded data using at least one session. A reception side includes:

means for receiving the multiplexed encoded data from the at least one session. Then, the encoded data that has been received with no transmission error or no dropout is extracted, and reconstruction is performed, for decoding.

In the present invention, a transmission side includes:

means for reading at least one item of encoded data and at least one item of error correction code data from a content file with M encoded data having different compression rates stored therein;

first through Nth encoded data transmission means; and at least one error correction code data transmission means; and may further include:

means for setting routing priority control on a transmission path for each session and power control on a wireless transmission path, wherein M and N are integers equal to or greater than one. Respective transmission means transmit encoded data using sessions mutually different to one another. A reception side includes:

means for receiving the encoded data and the error correction code data from at least one of the sessions; and may further includes:

means for selecting whether to receive the encoded data from the at least one session based on a received data error and loss rate and/or power that can be used by the reception side and/or a setting set in advance. The encoded data that has been received with no transmission error or no dropout is extracted. When the transmission error or the dropout is present in the encoded data, the data is restored using the error correction code data, thereby reconstructing the encoded data, for decoding.

In a content distribution system according to other aspect of the present invention, a transmission side includes:

means for reading at least one item of encoded data and at least one item of error correction code data from a content file with M encoded data having different compression rates stored therein;

first through Nth encoded data processing means;

at least one item of error correction code data processing means; and means for multiplexing outputs of the first through Nth encoded data processing means and the error correction code data processing means, for transmission, wherein M and N are integers equal to or greater than one. The transmission side transmits the multiplexed data using at least one session. A reception side includes:

means for receiving the multiplexed data from the at least one session. The reception side extracts the encoded data received with no transmission error or no dropout. When the transmission error or the dropout is present, the data is restored using the error correction code data, and the encoded data is reconstructed, for decoding.

In a content distribution system according to other aspect of the present invention, a transmission side includes:

means for reading at least one item of encoded data, at least one Intra-frame encoded data, and at least one item of error correction code data from a content file with M encoded data having different compression rates stored therein;

first through Nth encoded data transmission means;

at least one Intra-frame encoded data transmission means;

at least one error correction code data transmission means; and may includes:

means for setting routing control on a transmission path and power control on a wireless transmission path for each session, wherein M and N are integers equal to or greater than one. The respective transmitting means transmit the encoded data using mutually different sessions. A reception side includes:

means for receiving the encoded data, Intra-frame encoded data, and error correction code data, and may further includes:

means for selecting whether to receive the encoded data from the at least one session based on error/loss rate of received data, and/or power that can be used by the reception side, and/or setting set in advance. The reception side extracts the encoded data received with no transmission error or no dropout. When the transmission error or the dropout is present, the data is restored using the error correction code data, and the encoded data is reconstructed, for decoding.

In a content distribution system according to other aspect of the present invention, a transmission side includes:

means for reading at least one item of encoded data, at least one Intra-frame encoded data, and at least one item of error correction code data from a content file with M encoded data having different compression rates stored therein;

first through Nth encoded data processing means;

at least one Intra-frame encoded data processing means;

at least one item of error correction code data processing means; and means for multiplexing outputs of the first through Nth encoded data processing means, Intra-frame encoded data processing means, and error correction code data processing means, for transmission, wherein M and N are integers equal to or greater than one. The transmission side transmits the multiplexed data using at least one session. A reception side includes:

means for receiving the multiplexed data from the at least one session. The reception side extracts the encoded data received with no transmission error or no dropout. When the transmission error or the dropout is present, the data is restored using the error correction code data, and the encoded data is reconstructed, for decoding.

An encoding method according to other aspect of the present invention is the encoding method performed by an encoding apparatus creating a content file. The method includes:

first through Mth encoding processing steps of encoding an input signal or an input data file at mutually different compression rates, respectively, for output, (wherein M is an integer equal to or greater than two); and a step of writing encoded data obtained by the encoding at the first through Mth encoding processing steps into the file as independent tracks, respectively.

An encoding method according to other aspect of the present invention includes:

first through Mth encoding processing steps of encoding an input signal or an input data file at mutually different compression rates, respectively, for output (wherein M is an integer equal to or greater than one);

a step of generating at least one item of error correction code data for encoded data obtained by encoding at the first through Mth encoding processing steps; and a step of writing the encoded data and the error correction code data into a file as independent tracks, respectively.

The encoding method according to the other aspect of the present invention, further includes the steps of:

Intra-frame encoding the input signal or the input data file; and writing encoded data obtained by the encoding into the file as an independent track.

An encoding method according to other aspect of the present invention includes:

first through Mth encoding processing steps of encoding an input signal or an input data file at mutually different compression rates, for output (wherein M is an integer equal to or greater than two); and a step of writing the encoded data with a preset time difference or interleaving into a file as independent tracks, respectively.

A program according to other aspect of the present invention is constituted from the program for causing a computer constituting the encoding apparatus to execute the processing steps of The encoding method described above.

A content distribution method according to other aspect of the present invention includes the steps of:

reading at least one item of encoded data from a content file, by a content distribution apparatus; and transmitting at least a part of first through Nth encoded data using first through Nth encoded data transmission processing (wherein N is an integer equal to or greater than two), from the read encoded data, by the content distribution device.

A content distribution method according to other aspect of the present invention includes the steps of:

reading at least one item of encoded data and at least one item of error correction code data from a content file, by a content distribution device; and at least one of (a) transmitting at least a part of first through Nth encoded data (wherein N is an integer equal to or greater than one) from the read encoded data and the read error correction code data by the content distribution device; and (b) transmitting at least a part of the error correction code data from the read encoded data and the read error correction code data by the content distribution device.

The content distribution method according to the other aspect of the present invention, further includes the steps of:
reading at least one item of Intra-frame encoded data from the content file, by the content distribution device; and
transmitting the at least one Intra-frame encoded data by the content distribution device; and
the content distribution device transmits at least a part of the Intra-frame encoded data.

A program according to other aspect of the present invention is constituted from the program for causing a computer constituting the content distribution device to execute the processing steps of the content distribution method described above.

A content receiving method according to other aspect of the present invention includes:
at least one of steps of (a) receiving encoded data from at least one session, by a content receiving apparatus; and
(b) receiving multiplexed encoded data from at least one session, and identifying individual ones of the encoded data therefrom, by the content receiving apparatus; and
a step of extracting the encoded data received with no transmission error and no dropout from among the received encoded data and reconstructing the encoded data, for output, by the content receiving apparatus.

A content receiving method according to other aspect of the present invention includes:
at least one of steps of (a) receiving encoded data and error correction code data from at least one session, by a content receiving apparatus; and
(b) receiving encoded data and the error correction code data that have been multiplexed, from at least one session and identifying individual ones of the encoded data and the error correction code data therefrom, by the content receiving apparatus; and
a step of extracting the encoded data received with no transmission error and no dropout from among the received data and restoring the encoded data using the error correction code data when the transmission error or the dropout is present, thereby reconstructing the encoded data, by the content receiving apparatus.

The content receiving method according to the other aspect of the present invention further includes:
at least one of steps of (c) receiving Intra-frame encoded data from at least one session; and
(d) receiving the encoded data and the Intra-frame encoded data that have been multiplexed from at least one session and identifying individual ones of the encoded data therefrom, by the content receiving apparatus.

A program according to still other aspect of the present invention is constituted from the program for causing a computer constituting the content receiving apparatus to execute the processing steps of the content receiving method.

Meritorious Effects of the Invention

When the present invention is used, a disturbance in quality of content reproduced on a reception side, caused by a transmission error or a loss of encoded data can be minimized.

Further, when the present invention is used, a trade-off between a transmission band that can be utilized by a distributor for content data transmission and quality can be set by a content distribution service provider.

Further, when the present invention is used, the effects described above can be achieved without sending feedback information from the reception side to the transmission side.

Further, when the present invention is used, the transmission side can control quality and/or stability of content on the reception side.

Still further, when the present invention is used, quality and/or stability of content can be controlled according to power that can be utilized by a recipient.

Still further, when the present invention is used, the effects described above can be implemented while preventing an increase in an amount of operation required for decoding compressed encoded data.

Figure 1:
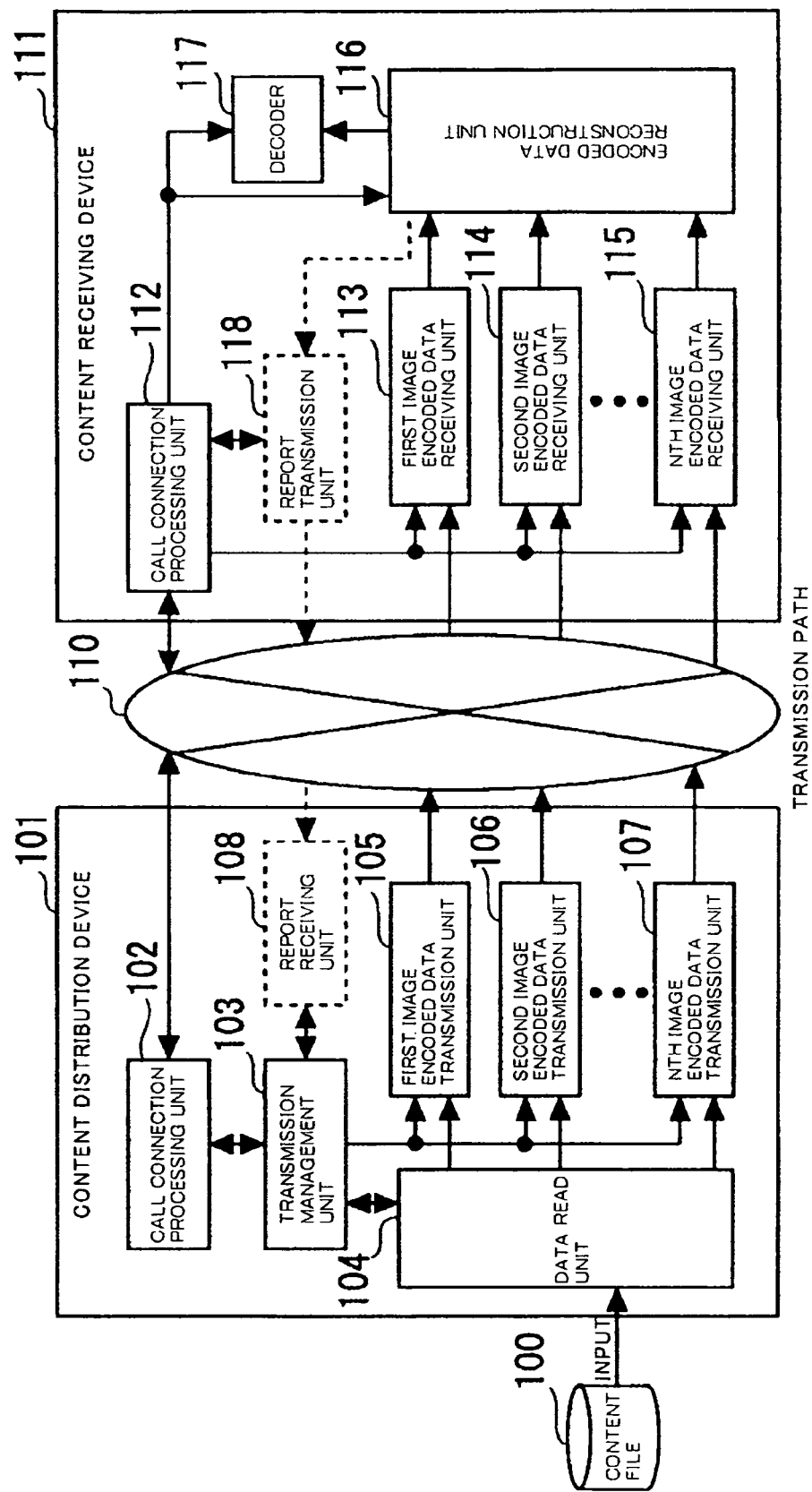
FIG. 1 is a diagram showing the configuration of a system in a first embodiment of the present invention.

EXPLANATIONS OF SYMBOLS 100 content file
101 content distribution device
102 call connection processing unit
103 transmission management unit
104 data read unit
105 first image encoded data transmission unit
106 second image encoded data transmission unit
107 Nth image encoded data transmission unit
108 report receiving unit
110 transmission path
111 content receiving apparatus
112 call connection processing unit
113 first image encoded data receiving unit
114 second image encoded data receiving unit
115 Nth image encoded data receiving unit
116 encoded data reconstruction unit
117 decoder
118 report transmission unit
200 image encoding system
201 camera
202 image data file
203 encoding processing unit
204 first image encoding processing unit
205 second image encoding processing unit
206 Mth image encoding processing unit
207 file formatting processing unit
208 content file
301 encoding processing unit
302 second image encoding processing unit
303 Nth image encoding processing unit
400 encoded data transmission unit
401 packetization processing unit
402 encoded data dividing unit
403 encryption processing unit
404 encoded data identifier addition unit
405 error detection code addition unit
406 delay addition unit
407 transmission data selection unit
408 transmission unit
500 encoded data reconstruction unit
501 data extracting unit
502 encoded data identifier extracting unit
503 encoded data extracting unit
504 encoded data alignment and duplication removal processing unit
505 encryption restoring unit
601 content distribution device
602 first image encoded data processing unit
603 second image encoded data processing unit
604 Nth image encoded data processing unit
605 packet multiplexing transmission unit
610 transmission path
611 content receiving apparatus
618 packet receiving unit
700 encoded data processing unit
800 content file
801 content distribution device
802 call connection processing unit
803 transmission management unit
804 data read unit
805 first image encoded data transmission unit
806 second image encoded data transmission unit
807 Nth image encoded data transmission unit
808 report receiving unit
809 Intra-frame encoded data transmission unit
810 transmission path
811 content receiving unit
812 call connection processing unit
813 first image encoded data receiving unit
814 second image encoded data receiving unit
815 Nth image encoded data receiving unit
816 encoded data reconstruction unit
817 decoder
818 report transmission unit
819 Intra-frame encoded data receiving unit
900 image encoding device
901 encoding processing unit
902 Intra-frame encoding processing unit
903 file formatting processing unit
904 content file
1001 encoding processing unit
1101 content distribution device
1102 first image encoded data processing unit
1103 second image encoded data processing unit
1104 Nth image encoded data processing unit
1105 Intra-frame encoded data processing unit
1106 packet multiplexing transmission unit
1107 packet receiving unit
1110 transmission path
1111 content receiving apparatus
1201 content distribution device
1210 transmission path
1211 content receiving apparatus
1300 content file
1301 content distribution device
1302 call connection processing unit
1303 transmission management unit
1304 data read unit
1305 first image encoded data transmission unit
1306 second image encoded data transmission unit
1307 Nth image encoded data transmission unit
1308 report receiving unit
1309 FEC data transmission unit
1310 transmission path
1311 content receiving unit
1312 call connection processing unit
1313 first image encoded data receiving unit
1314 second image encoded data receiving unit
1315 Nth image encoded data receiving unit
1316 encoded data reconstruction unit 1317 decoder
1318 report transmission unit
1319 FEC data receiving unit
1400 image encoding device
1401 encoding processing unit
1402 FEC code processing unit
1403 file formatting processing unit
1404 content file
1501 encoding processing unit
1601 content distribution device
1602 first image encoded data processing unit
1603 second image encoded data processing unit
1604 Nth image encoded data processing unit
1605 FEC data processing unit
1606 packet multiplexing transmission unit
1607 packet receiving unit
1610 transmission path
1611 content receiving apparatus
1701 content distribution device
1710 transmission path
1711 content receiving apparatus
1800 content file
1801 content distribution device
1802 call connection processing unit
1803 transmission management unit
1804 data read unit
1805 first audio encoded data transmission unit
1806 second audio encoded data transmission unit
1807 Nth audio encoded data transmission unit
1808 report receiving unit
1810 transmission path
1811 content receiving apparatus
1812 call connection processing unit
1813 first audio encoded data receiving unit
1814 second audio encoded data receiving unit
1815 Nth audio encoded data receiving unit
1816 encoded data reconstruction unit
1817 decoder
1818 report transmission unit
1900 audio encoding device
1903 encoding processing unit
1904 first audio encoding processing unit
1905 second audio encoding processing unit
1906 Nth audio encoding processing unit
1907 file formatting processing unit
1908 audio encoded data file
2001 encoding processing unit
2002 second audio encoding processing unit
2003 Mth audio encoding processing unit
2101 content distribution device
2102 first audio encoded data processing unit
2103 second audio encoded data processing unit
2104 Nth audio encoded data processing unit
2105 packet multiplexing transmission unit
2111 content receiving apparatus
2118 packet receiving unit
2200 content file
2201 content distribution device
2202 call connection processing unit
2203 transmission management unit
2204 data read unit
2205 first audio encoded data transmission unit
2206 second audio encoded data transmission unit
2207 Nth audio encoded data transmission unit
2208 report receiving unit
2209 FEC data transmission unit
2210 transmission path
2211 content receiving unit
2212 call connection processing unit
2213 first audio encoded data receiving unit
2214 second audio encoded data receiving unit
2215 Nth audio encoded data receiving unit
2216 encoded data reconstruction unit
2217 decoder
2218 report transmission unit
2219 FEC data receiving unit
2300 audio encoding device
2301, 2401 encoding processing unit
2302 FEC code processing unit
2303 file formatting processing unit
2304 content file
2501 content distribution device
2502 first audio encoded data processing unit
2503 second audio encoded data processing unit
2504 Nth audio encoded data processing unit
2505 FEC data processing unit
2506 packet multiplexing transmission unit
2507 packet receiving unit
2510 transmission path
2511 content receiving apparatus
2601 content distribution device
2610 transmission path
2611 content receiving apparatus
2700 encoded data reconstruction unit
2701 error correction code restoring processing unit

BEST MODE FOR CARRYING OUT THE INVENTION

In order to describe the present invention in further detail, a description will be given about embodiment modes of the invention with reference to appended drawings.

First Embodiment Mode of the Invention

In a first embodiment mode of the present invention, a transmission side includes means for reading at least one item of encoded data from a content file with M encoded data having different compression rates stored therein, first through Nth encoded data transmission means, and means for setting routing priority control on a transmission path for each session and setting power control on a wireless transmission path, wherein M and N are integers equal to or greater than two. Respective transmission means transmit encoded data using mutually different sessions. A reception side includes means for receiving the encoded data from at least one session, and may include means for selecting whether to receive the encoded data from the at least one session based on an error and loss rate of the received data, and/or power that can be used by the reception side, and/or a setting set in advance. The encoded data received without a transmission error or a dropout is extracted, and reconstruction is performed, for decoding.

First Embodiment

Next, a first embodiment of the present invention will be described with reference to drawings.

FIG. 1 shows a configuration of the first embodiment of the present invention. As shown in FIG. 1, the embodiment is constituted from a content distribution device 101, a content receiving apparatus 111, and a transmission path 110 for transmitting content data. In the present embodiment, the content distribution device 101 is connected to the transmission path 110, which is an IP (Internet Protocol) network. Encoded data is distributed using a UDP (User Datagram Protocol)/IP. The content receiving apparatus 111 is a client terminal connected to the IP network. Meanwhile, for simplicity, herein, a description will be given, assuming that the content to be distributed is moving picture data.

The content distribution device 101 in the first embodiment includes a call connection processing unit 102, a transmission management unit 103, a data read unit 104, and first through Nth image encoded data transmission units 105 through 107. A content file 100 including data encoded at M different compression rates (rates) is read by the data read unit 104 in the content distribution device 101. Then, based on a transmission setting set at the transmission management unit 103, N encoded data are selected from among it and transmitted to the content receiving apparatus 111 from the first through Nth image encoded data transmission units 105 through 107 through the transmission path 110.

The content receiving apparatus 111 in the first embodiment includes a call connection processing unit 112, first through Nth image encoded data receiving units 113 through 115, an encoded data reconstruction unit 116, and a decoder 117. Based on call connection processing performed by the call connection processing unit 112 of the content receiving apparatus 111 and the call connection processing unit 102 of the content distribution device 101, image encoded data are received by the first through Nth image encoded data receiving means 113 through 115. Then, data is selected by the encoded data reconstruction unit 116 from among the image encoded data received without a data error nor a dropout, based on a compression rate, and reconstructed into one moving image encoded data, for decoding.

Now, an image encoding device that generates the content file 100 in FIG. 1 will be described, using FIG. 2.

An image encoding device 200 includes an encoding processing unit 203 and a file formatting processing unit 207. The encoding processing unit 203 includes first through Mth image encoding processing units 204 through 206. The image encoding system 200 inputs a video signal from a camera 201 or video information from a video data file 202. Then, in the encoding processing unit 203, encoding processing is performed by the first through Mth image encoding processing units 204 through 206 at predetermined compression rates, respectively. Encoding processing herein is performed using the same encoding method, the same frame configuration, the same frame rate, the same Intra-frame interval, and the same image size. The encoding is performed so that an encoding unit of encoded data becomes the data obtained by encoding the same frame and the same region of input video. When an MPEG-4 scheme is used as the encoding scheme, for example, a video packet, which is an encoding unit generated by the first through Mth image encoding processing units 204 through 206, respectively, corresponds to encoded data obtained by encoding the same region of the same frame at each of the compression rates.

The encoded data are converted into a file according to a predetermined file format at the file formatting processing unit 207 and are output in the form of content file 208. As a file format standard, an MP4 file format, a 3GP file format, or the like, for example, is employed. In this case, first through Mth image encoded data are written onto first through Mth tracks, respectively, each together with a hint track, so that each encoding unit such as the video packet or the like becomes a sample for each of the tracks. On this occasion, the encoded data may be processed in advance so that the data on the respective tracks are distributed with time difference or interleaving, and may be output into a file.

As described above, by storing the processed data in a file in advance, a burden on processing on a distribution side can be reduced more than a case where a rate conversion is performed for each of streams of the processed data at the time of content distribution.

Figure 2:
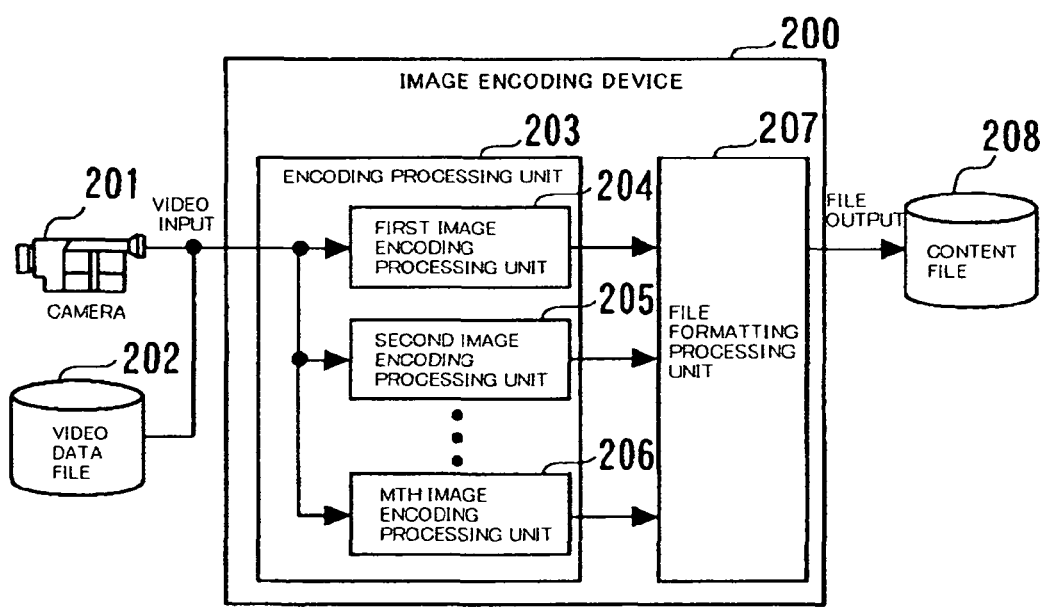
FIG. 2 is a diagram showing the configuration of an image encoding device in the first embodiment and a second embodiment of the present invention.
Figure 3:
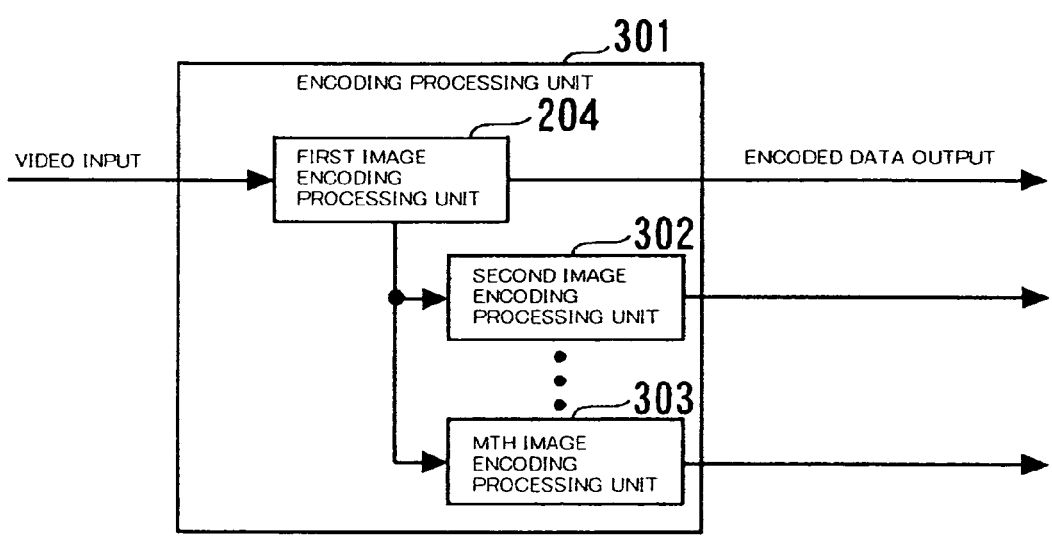
FIG. 3 is a diagram showing the configuration of an encoding processing unit in the first and second embodiments of the present invention.

The encoding processing unit 203 in FIG. 2 may have a configuration, like an encoding processing unit 301 shown in FIG. 3, in which second through Mth encoding processing units 302 through 303 perform the encoding processing by reusing an encoding parameter such as a motion vector obtained at a time of the encoding processing at the first image encoding processing unit 204 and output the encoded data.

A detailed description will be given about the content distribution device 101 and the content receiving apparatus 111.

The transmission management unit 103 in FIG. 1 sets at least one of:

(A1) compression rates of encoded data to be read at the data read unit 104 (content track)

(A2) transmission destination addresses and port numbers for transmission by the first through Nth transmission units 105 through 107

(A3) identification information on the encoded data to be transmitted by the first through Nth transmission units 105 through 107

(A4) presence or absence of encryption of the encoded data to be transmitted by the first through Nth transmission units 105 through 107

(A5) encryption key data on the encoded data to be transmitted by the first through Nth transmission units 105 through 107

(A6) a transmission time difference or interleave setting of the encoded data to be transmitted by the first through Nth transmission units 105 through 107

(A7) a selection criterion of the encoded data to be transmitted by the first through Nth transmission units 105 through 107

(A8) routing priority in a session to be transmitted by the first through Nth transmission units 105 through 107 and/or transmission power when a wireless transmission path is used.

Based on this, connection processing is performed between the call connection processing unit 102 and the call connection processing unit 112 of the content receiving apparatus 111 using an RTSP (Real Time Streaming Protocol)/SDP (Session Description Protocol) or the like. All of these can also be set in advance between the content distribution device 101 and the content receiving apparatus 111. Then, a content may also transmitted and received (in regard to the RTSP and the SDP, refer to Non-patent Documents 1 and 2 described above, respectively).

The data read unit 104 reads image encoded data from the respective tracks of the content file 100 based on the setting at the transmission management unit 103, and/or the setting set in advance between the content distribution device 101 and the content receiving apparatus 111, for output to the first through Nth image encoded data transmission units 105 through 107. On this occasion, the image encoded data read in from the same track may be output to a plurality of the image encoded data transmission units.

The first through Nth image encoded data transmission units 105 through 107 transmit first through Nth encoded data to the content receiving apparatus 111 through the transmission path 110 based on the setting at the transmission management unit 103 and/or the setting set in advance between the content distribution device 101 and the content receiving apparatus 111. On this occasion, routing priority control on the transmission path 110 and power control on the wireless transmission path may be set for each session. When setting is performed so that encoded data with a lower compression rate and higher image quality is transmitted wirelessly with a higher routing priority and with larger power, for example, the quality of an image reproduced on the reception side can be maintained to be higher.

Figure 4:
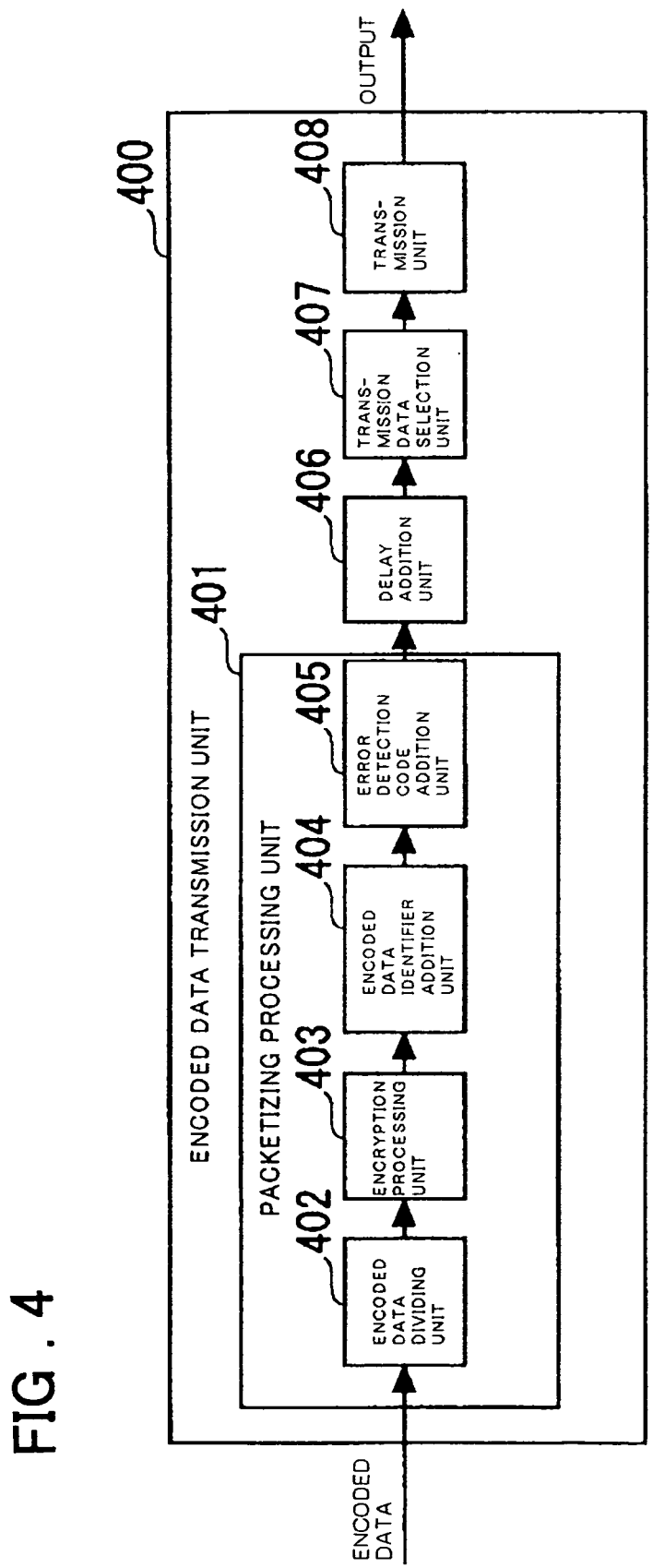
FIG. 4 is a diagram showing the configuration of an encoded data transmission unit in the first embodiment and third and fifth embodiments of the present invention.

FIG. 4 is a diagram showing the configuration of one of the image encoded data transmission units 105 to 107 in FIG. 1. A description will be given about the image encoded data transmission unit, using FIG. 4.

An image encoded data transmission unit 400 includes a packetization processing unit 401, a delay addition unit 406, a transmission data selection unit 407, and a transmission unit 408. The packetization processing unit 401 includes an encoded data dividing unit 402, an encryption processing unit 403, an encoded data identifier addition unit 404, and an error detection code addition unit 405.

The packetization processing unit 401 packetizes input encoded data.

The encoded data dividing unit 402 performs division of the encoded data into encoded data transmitting units in order to packetize the encoded data.

The encryption processing unit 403 performs encryption of the encoded data when the encryption is necessary, based on presence or absence of the encryption, an encryption key, and setting on encryption intensity. With regard to an encryption scheme, a known method is employed.

The encoded data identifier addition unit 404 uses a payload type of an RTP (Real-time Transport Protocol) header, an SSRC (Synchronization Source identifier), or a CSRC (Contributing Source identifier), for example, or adds identification information corresponding to these so that a compression rate level of the input encoded data or the like is identified (in regard to the RTP header, refer to Non-patent Document 3).

The content receiving apparatus 111 can grasp the compression rate and/or a layer of encoded data according to the call connection processing and/or correspondences between the identification information and the compression rate set in advance between the content distribution device 101 and the content receiving apparatus 111.

The error detection code addition unit 405 adds a checksum of a UDP header or information corresponding thereto.

A delay is added to a packet output from the packetization processing unit 401 by the delay addition unit 406 so that the packet is output with a time difference from an output from other image encoded data transmission unit or with interleave processing performed thereon, for output, based on a delay amount set in advance or interleave setting.

The encoded data dividing unit 402 divides the encoded data that has been input into the encoded data transmitting units so that the encoding unit obtained by encoding the same region of the same frame of an image is included in packets transmitted from the first through Nth image encoded data transmission units 105 through 107 in FIG. 1, respectively. When the MPEG-4 encoding method is employed, the encoding unit becomes the video packet. On this occasion, a plurality of the encoding units may be included in one transmission packet. The encoding units included in the one transmission packet become data obtained by encoding the same region of the image.

The encoded data identifier addition unit 404 adds to the same transmitting unit from each of the image encoded data transmission units the same sequence number of the RTP header or the same identification number corresponding thereto. With this arrangement, the content receiving apparatus 111 can perform data selection using a transmitting unit when a plurality of duplicate encoded data are received. Further, the content receiving apparatus 111 can thereby arrange an order of received encoded data correctly even if the order of the received encoded data is interchanged.

The encryption at the first through Nth image encoded data transmission units 105 through 107 may be performed just by on and after the certain image encoded data transmission unit. Then, by controlling presence or absence of distribution of the encryption key for each content receiving apparatus 111, a quality (image quality) level and stability of the quality of content to be reproduced at the content receiving apparatus and stability of the quality can also be controlled by the content distribution device 101.

The setting on the delay amount to be added by the first through Nth image encoded data transmission units 105 through 107 can also be dynamically changed according to a report on a reception status using the RTCP (RTP Control Protocol) or information corresponding thereto from the content receiving apparatus 111, even during the content distribution. The change is such that when a packet loss rate is high and/or when a burst length of a packet loss is long, the delay amount is increased, for example.

When the delay amount is changed, it is preferable that the changed delay amount is notified to the content receiving apparatus 111 newly from the call connection processing unit 102 of the content distribution device 101, or a buffer capable of coping with the change in the delay amount of a packet is originally provided at the content receiving apparatus 111.

Meanwhile, in regard to the delay, any one of the first through Nth encoded data may be transmitted the earliest. A method of providing the time difference for data subsequent to encoded data transmitted first may be used. Alternatively, a method of providing the time difference sequentially, for transmission of the encoded data may be used.

Based on the setting on selection of the data for transmission, the transmission data selection unit 407 selects a packet for encoded data to be transmitted. Then, in each session, the packet is transmitted from the transmission unit 408 through the transmission path 110.

In the selection, the packet to be transmitted is adaptively selected according to a property of the image and a condition of the transmission path. When the selection is made, the packet may be selected for each constant period (once for n packets), for example, for transmission. Alternatively, a characteristic parameter in encoded data or the parameter, such as the motion vector, which may greatly influence a decoded image due to a bit error or the packet loss may be referred to, and the packet to be transmitted may be adaptively determined.

Alternatively, the selection may be made according to a rule defining that a frame to be referred to (an Intra-frame) is definitely selected.

Further, when the first through Nth encoded data are scalable encoded data, priority may be given to data in a more upper layer, for selection. In this selection method, the selection setting can also be changed dynamically even during the distribution of content.

Further, when traffic control is not required in such a case as there is a margin left in band of the network, this transmission data selection unit 407 may be dispensed with. Then, a function of the transmission data selection unit 407 may be selected.

Further, in order to efficiently utilize the band of the network, the data read unit 104 can also read in image encoded data from the content file 100 according to one of following conditions:

Compression rates of the second through Nth encoded data are equal to or higher than the compression rate of the first encoded data.

The compression rate of Kth encoded data is equal to or higher than the compression rate of (K−1)th encoded data, in which K is an integer not less than two but not more than N.

In addition, setting of the compression rates can also be dynamically changed even during the distribution of content according to the RTCP reception status report or the information corresponding thereto from the content receiving apparatus. When the packet loss rate is high, for example, image encoded data having a higher compression rate is read by the data read unit 104. In addition, when an amount of the encoded data for transmission needs to be further reduced, transmission of the encoded data from an arbitrary one of the first through Nth image encoded data transmission units 105 through 107 can also be stopped. The number of encoded data for distribution can be determined by a tradeoff between the band that can be used for the distribution and stability of content for the distribution.

Further, by controlling for each content receiving apparatus 111 session information to be notified by the call connection processing among first through Nth distribution sessions, the quality (image quality) level and quality stability of content to be reproduced by each content receiving apparatus 111 can be controlled.

Further, the first through Nth encoded data transmission units can adopt either of the following methods:

All of the first through Nth encoded data transmission units perform multicast or broadcast transmission of packets.

At least one of the first through Nth encoded data transmission units performs unicast transmission of packets. Other transmission units perform multicast or broadcast transmission of packets. In this case as well, by notifying information for multicast reception to all content receiving apparatuses and performing unicast distribution to a specific content receiving apparatus by control during the call connection processing, for example, the quality (image quality) level and the quality stability of content to be reproduced by the content receiving apparatus 111 can be similarly controlled.

Next, the content receiving apparatus 111 will be described in detail.

The call connection processing unit 112 exchanges at least one of the following data with the call connection processing unit 102 of the content distribution device 101 through the transmission path 110, thereby performing call establishment:

(A1) an address of the content receiving apparatus 111

(A2) reception port numbers of the first through Nth receiving units 113 through 115

(A3) correspondences between compression rates of encoded data received by the first through Nth receiving units 113 through 115 and identification information added to packets (A4) presence or absence of encryption of the encoded data received by the first through Nth receiving units 113 through 115

(A5) encryption key data of the encoded data received by the first through Nth receiving units 113 through 115

(A6) a time difference or interleave setting between the encoded data received by the first through Nth receiving units 113 through 115

(A7) a receive buffer size based on the time difference or interleave setting between the encoded data received by the first through Nth receiving units 113 through 115

(A8) a port number for transmission of the reception status report (A9) an encoding option (tool to be used) of the encoded data (A10) a payload option of the encoded data The first through Nth receiving means 113 through 115 respectively checks whether a received packet is influenced by a data error in the course of transmission, based on the checksum of the UDP header or the information corresponding thereto. In case the error occurs, each of the first through Nth receiving means 113 through 115 discards the packet. In case the error does not occur, each of the first through Nth receiving means 113 through 115 outputs the packet to the encoded data reconstruction unit 116.

Figure 5:
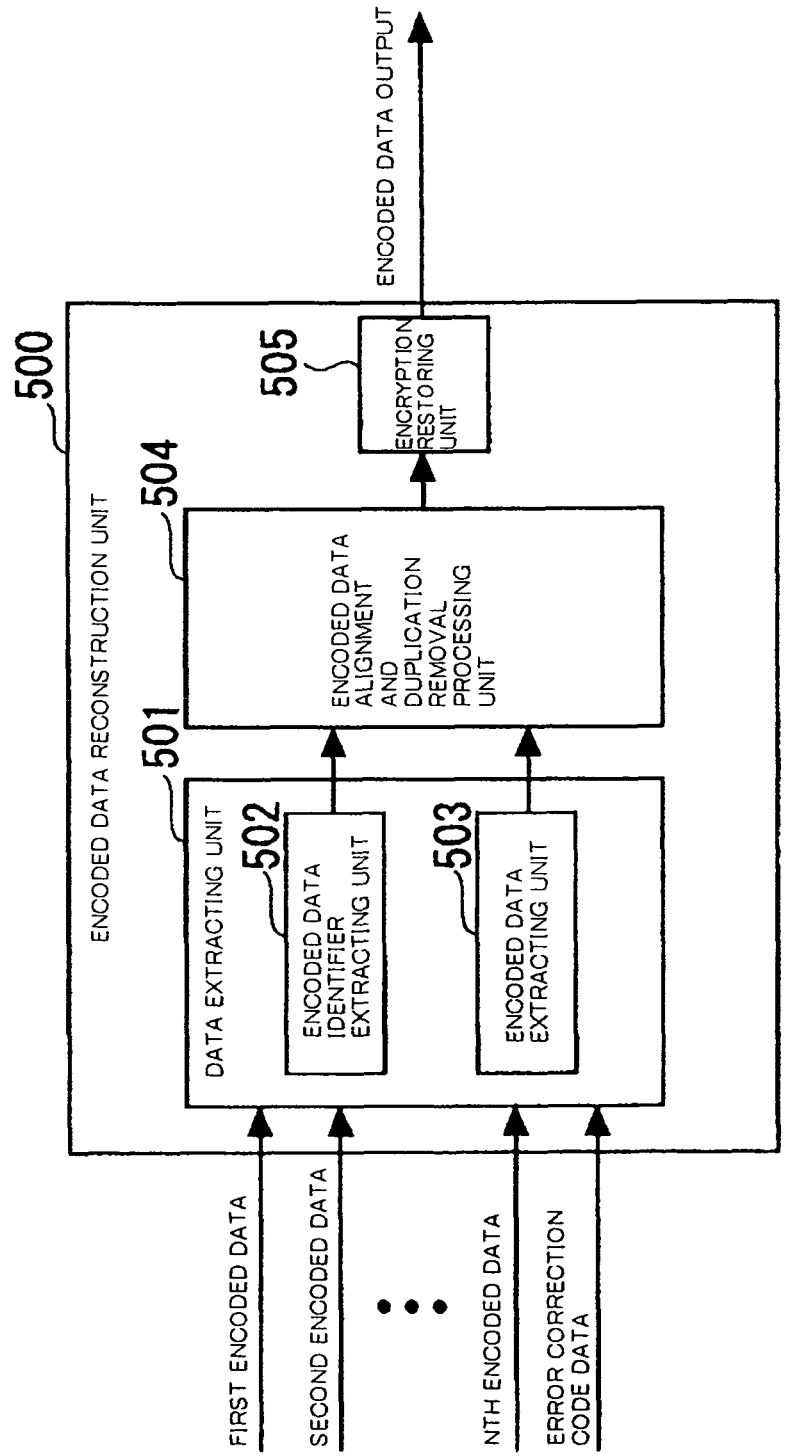
FIG. 5 is a diagram showing the configuration of an encoded data reconstruction unit in the first through fifth embodiments and a sixth embodiment of the present invention.

FIG. 5 is a diagram showing the configuration of the encoded data reconstruction unit 116 in FIG. 1 (indicated by reference numeral 500). The encoded data reconstruction unit 500 will be described using FIG. 5. The encoded data reconstruction unit 500 includes a data extracting unit 501, an encoded data alignment and duplication removal processing unit 504, and an encryption restoring unit 505. The data extracting unit 501 includes an encoded data identifier extracting unit 502 and an encoded data extracting unit 503. The encoded data identifier extracting unit 502 extracts encoded data identification information. The encoded data extracting unit 503 extracts encoded data.

The encoded data alignment and duplication removal processing unit 504 makes a judgment on alignment (deinterleaving) of the encoded data that have been received and duplication of encoded data transmitting units based on the extracted encoded data identification information. When duplicate reception is performed, the compression rates of the data are identified according to the identification information and/or received sessions, and the data with a lowest compression rate is selected. Then, based on information obtained at the call connection processing unit 112 or a payload option set in advance between the content distribution device 101 and the content receiving apparatus 111, payload format processing is performed if necessary, and the data is reconstructed into one encoded data, for output to the encryption restoring unit 505.

The encryption restoring unit 505 restores the received encoded data, for output when the received encoded data is encrypted, based on information obtained at the call connection processing unit 112 or information on the presence or absence of encryption, the encryption scheme, and the encryption key set in advance between the content distribution device 101 and the content receiving apparatus 111. Restoration from the encryption is also performed on the encoded data that have been reconstructed into the one encoded data. Thus, the restoration becomes possible with a minimum processing amount.

The identification information on the data is constituted from the compression rate of the received encoded data and/or data indicating a transmission order of the encoded data and an RTP header sequence number indicating a transmission order of an encoded data transmitting unit or an identification number corresponding thereto. In this case, it is also possible to make determination as to the data other than information on the orders, from the session in which the encoded data has been received.

Since the first through Nth encoded data are transmitted with a time difference therebetween or interleaving set on a content distribution side. Thus, the encoded data alignment and duplication removal processing unit 504 includes a buffer that can accommodate the time difference or the interleaving obtained at the call connection processing unit 112, or the encoded data with the time difference or the interleaving, set in advance between the content distribution device 101 and the content receiving apparatus 111. The encryption restoring unit 505 restores the encryption, for output, if necessary, based on the information on the presence or absence of the encryption and the encryption key, obtained at the call connection processing unit 112. Since the restoration from the encryption is performed just on the encoded data that have been reconstructed into the one encoded data, the restoration becomes possible with a minimum amount of processing.

When the content receiving apparatus 111 is used in a power-limited environment, such as the one operated by a battery/cell, and/or when a reception environment is satisfactory and image encoded data with a low compression rate can be received with little error or dropout, reception of a session for distributing image encoded data with a high compression rate may be stopped. A usage time of the device is thereby increased as much as possible. On the contrary, when a large-capacity battery or an AC power source is connected, the number of sessions for receiving image encoded data may be increased. Whether to perform data reception or not may be controlled as described above according to available power or the reception environment. Alternatively, it may be so arranged that a recipient can set the number of the image data to be received in the image data reception device 111.

The decoder 117 decodes the reconstructed encoded data based on the information obtained at the call connection processing unit 112 or the encoding option set in advance between the content distribution device 101 and the content receiving apparatus 111, and performs media reproduction. Since decoding is performed just on the one reconstructed encoded data, a processing amount required for the decoding will not be increased in the present invention.

A report transmission unit 118 transmits to a report receiving unit 108 of the content distribution device 101, which is a transmitting destination a reception status of the image encoded data obtained at the encoded data reconstruction unit as a RTCP RR(Receiver Report) or information corresponding thereto, based on information obtained at the call connection processing unit 112 or set in advance between the content distribution device 101 and the content receiving apparatus 111, thereby reporting the reception status to the content distribution device 101. It sometimes happens that transmission and reception of this reception status report is not performed when multicast distribution of content is performed, for example. In such a case, the aforementioned function does not need to be included.

Meanwhile, a plurality of transmission paths may be provided, and respective distribution sessions of the first through Nth encoded data and information on the call connecting processing may be transmitted through the different transmission paths.

Alternatively, respective functions and processing of the call connection processing unit 102, transmission management unit 103, data read unit 104, first through Nth image encoded data transmission units 105 through 107, and report receiving unit 108 in the content distribution device 101 may be of course implemented by program control executed by a computer constituting the content distribution device 101.

Respective functions and processing of the call connection processing unit 112, first through Nth receiving units 113 through 115, encoded data reconstruction unit 116, decoder 117, and report transmission unit 118 in the content receiving apparatus 111 may be of course implemented by program control executed by a computer constituting the content receiving apparatus 111.

Figure 18:
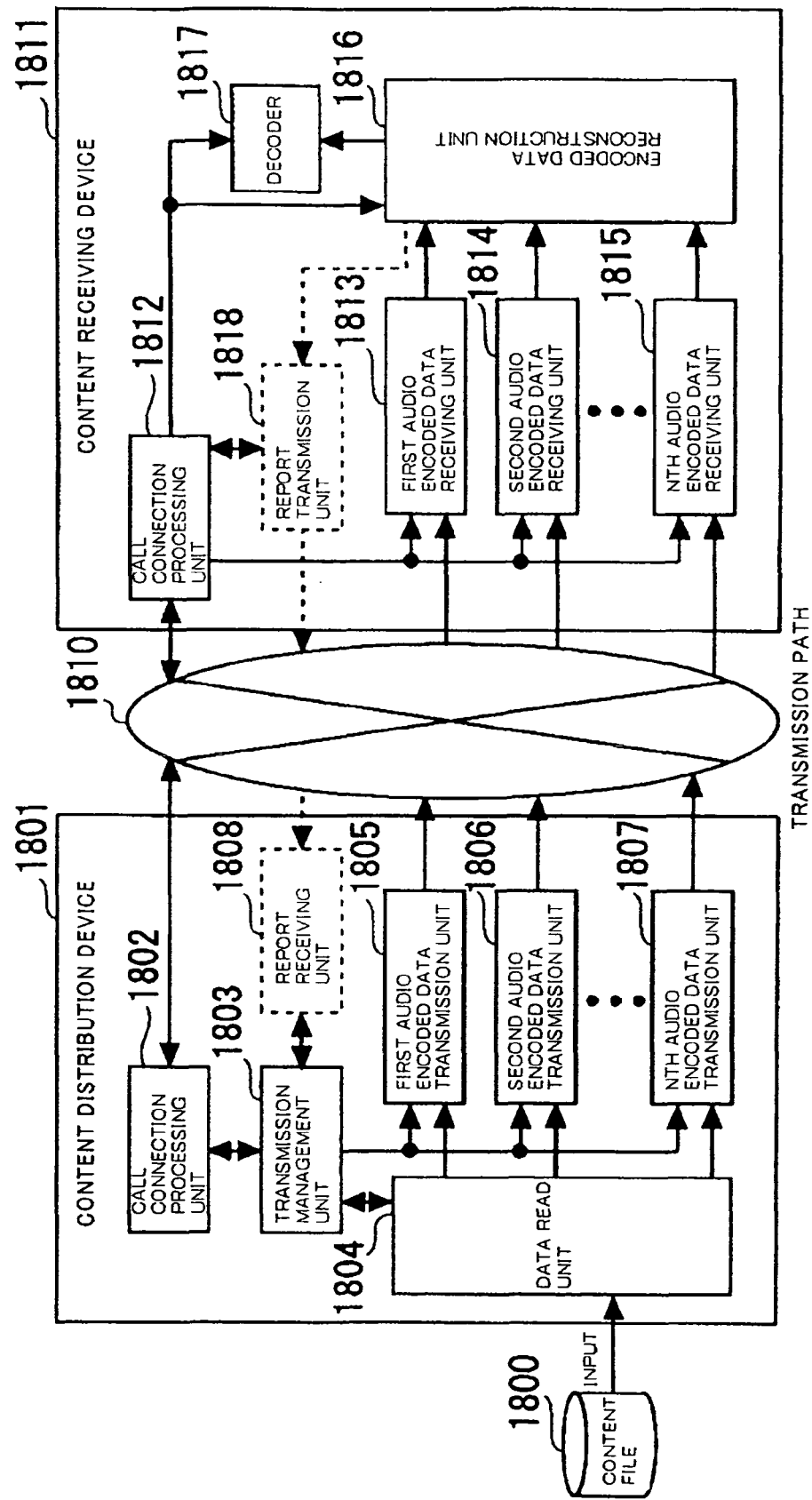
FIG. 18 is a diagram showing a variation example of the system configuration in the first embodiment of the present invention.
Figure 19:
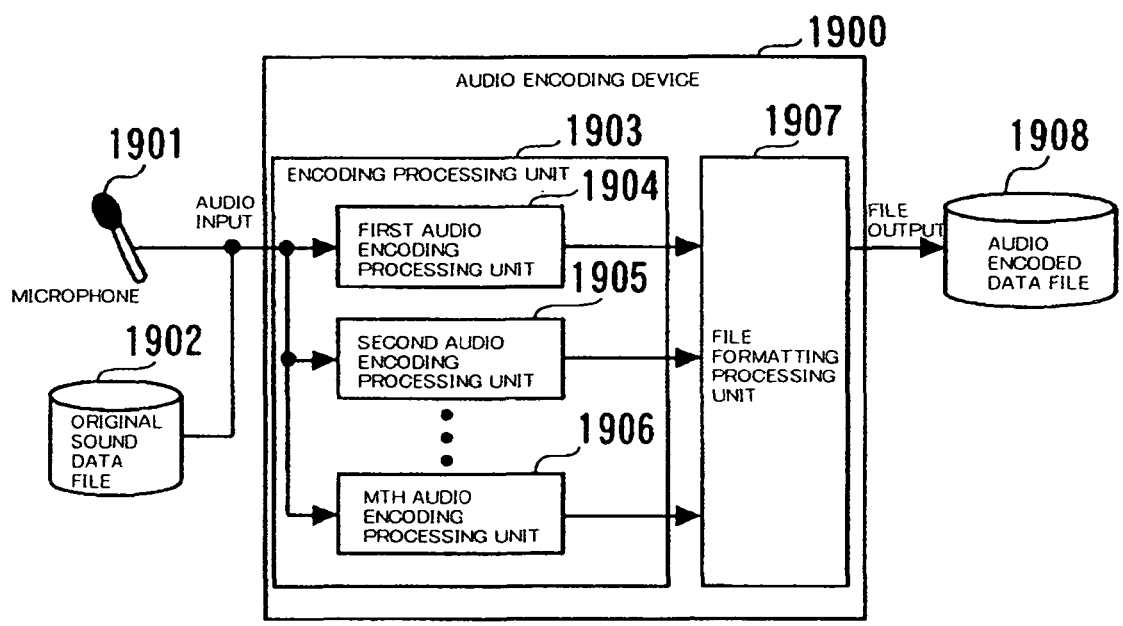
FIG. 19 is a diagram showing the configuration of an audio encoding device for creating a content file in FIG. 18.
Figure 20:
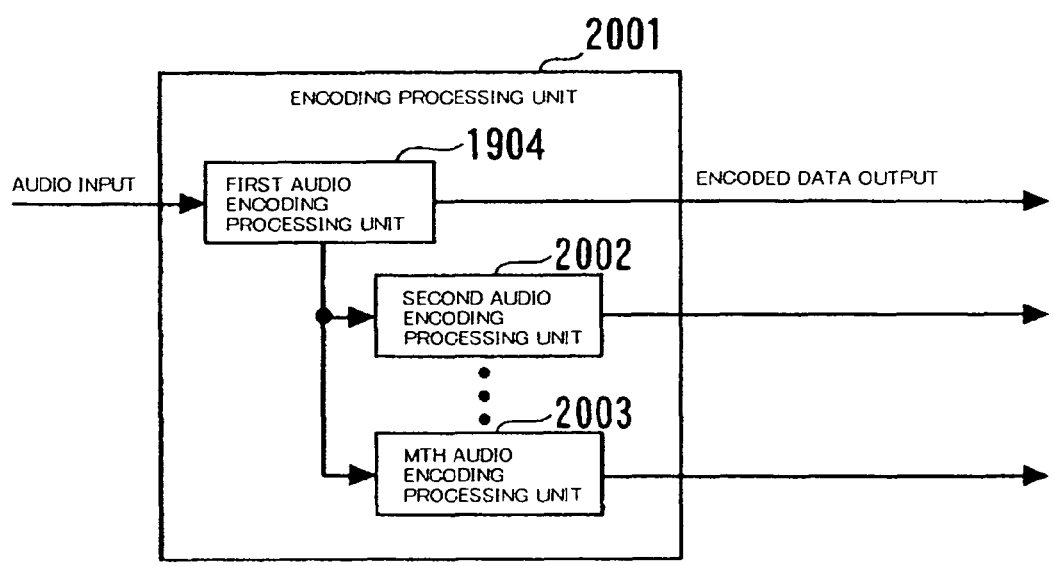
FIG. 20 is a diagram showing an example of a configuration of an encoding processing unit in FIG. 18.

In the present embodiment described above, by performing the same processing as that on audio encoded data as well shown in FIGS. 18 through 20, the same operation and effect can be obtained.

Elements indicated by reference numerals 100 through numerals 1800 through 1818 shown in FIG. 18, respectively. Referring to FIG. 18, a content distribution device 1801 for distributing an audio signal includes a data read unit 1804 for reading audio data from a content file 1800, first through Nth audio encoded data transmission units 1805 through 1807, a call connection processing unit 1802, a transmission management unit 1803, and a report receiving unit 1808. A content receiving apparatus 1811 includes first through Nth audio encoded data receiving units 1813 through 1815, an encoded data reconstruction unit 1816, a decoder 1817, a call connection processing unit 1812, and a report transmission unit 1818.

The camera 201 and the video data file 202, shown in FIG. 2 are replaced by a microphone (microphone) 1901 and an original sound data file 1902, shown in FIG. 19 in an audio encoding device, respectively. Referring to FIG. 19, an audio encoding device 1900 includes an encoding processing unit 1903 having first through Mth audio encoding processing units 1904 through 1906 for inputting an audio signal from the microphone 1901 or the original sound data file 1902, for encoding respectively and a file formatting processing unit 1907. Encoded data from the first through Mth audio encoding processing units 1904 through 1906 are output to an audio encoding data file 1908 as independent tracks, respectively. Further, the image encoding device 200 and the content file 208, shown in FIG. 2 are replaced by the audio encoding device 1900 and the audio encoding data file 1908, shown in FIG. 19, respectively.

The encoding processing unit 301 in FIG. 3 is constituted from an encoding processing unit 2001 in FIG. 20. The encoding processing unit 1903 (including the units 1904 to 1906 in FIG. 19) includes a first audio encoding processing unit 1904, a second audio encoding processing unit 2002 for performing encoding, using a result of processing (encoding parameter) by the first audio encoding processing unit 1904, and a third audio encoding processing unit 2003.

A processing flow in each of the units should be obtained by performing the same processing described using FIGS. 1 through 3.

Meanwhile, an encoding unit of encoded data is data on input audio in the same time period, and this is sampled at the same sampling frequency. Then, quantization at the same quantization bit number is performed, for encoding. Encoding units with different compressing rates can be thereby mutually substituted for one another.

When the content file 1800 in FIG. 18 includes both image encoded data and audio encoded data and when the content distribution device and the content receiving apparatus each include a function of processing both of the image encoded data and the audio encoded data, the operation and the effect of the present embodiment described above on both image and sound can be of course obtained.

Second Embodiment Mode of the Invention

In a second embodiment mode of the present invention, a transmission side includes means for reading at least one item of encoded data from a content file with M encoded data having different compression rates stored therein, first through Nth encoded data processing means, and means for multiplexing outputs of the first through Nth encoded data processing means for transmission, wherein M and N are integers equal to or greater than two. The transmission side transmits the multiplexed encoded data using at least one session. A reception side includes means for receiving the multiplexed encoded data from the at least one session. Then, the encoded data that has been received with no transmission error or no dropout is extracted, and reconstruction is performed, for decoding.

Second Embodiment

Next, a second embodiment of the present invention will be described with reference to drawings.

Figure 6:
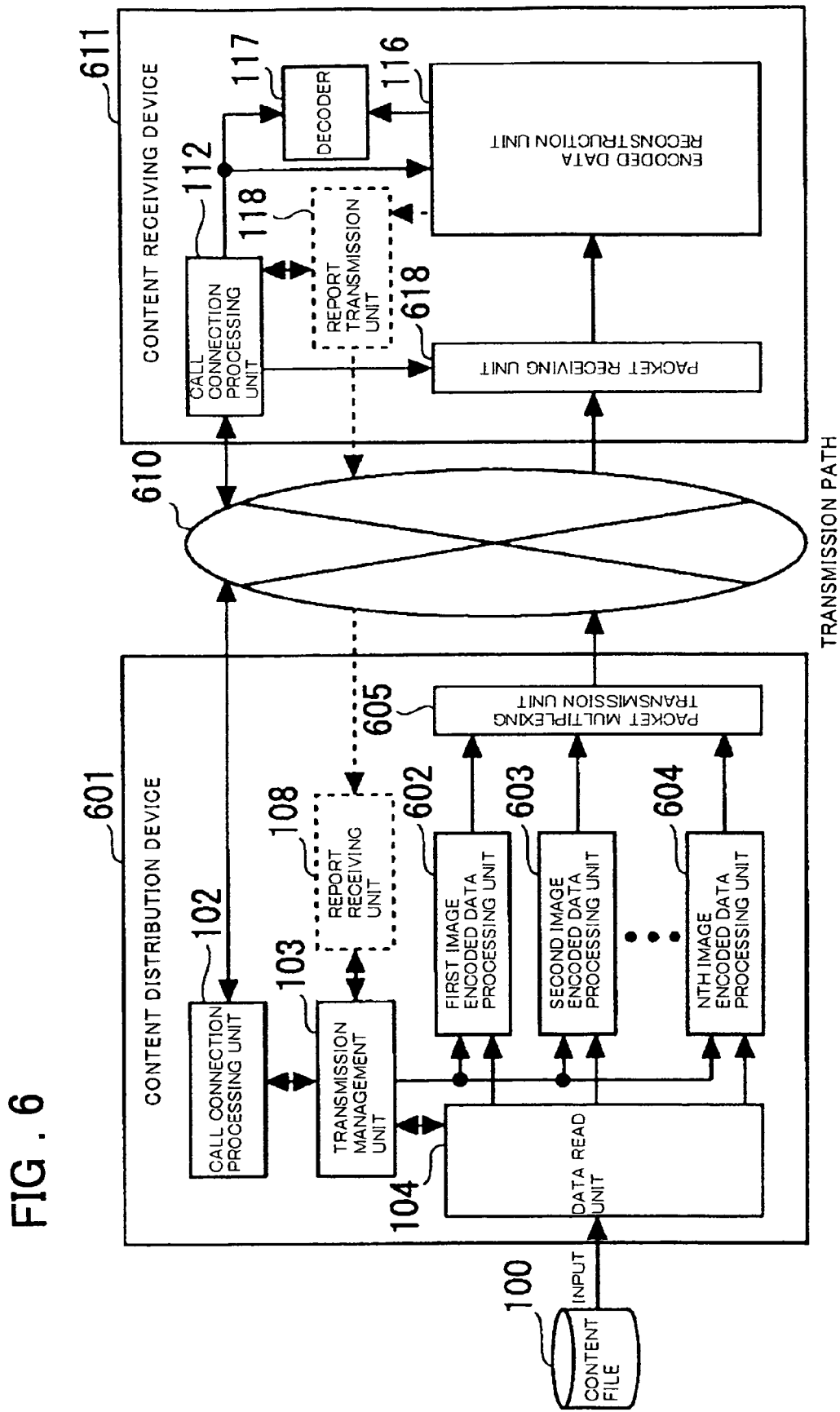
FIG. 6 is a diagram showing a system configuration in the second embodiment of the present invention.

FIG. 6 is a diagram showing the configuration of the second embodiment of the present invention. A content distribution device 601, a content receiving apparatus 611, and a transmission path 610, shown in FIG. 6 correspond to the content distribution device 101, content receiving apparatus 111, and transmission path 110, in FIG. 1 showing the first embodiment, respectively. The second embodiment of the present invention will be described below, centering on the difference from the first embodiment. The content distribution device 601 includes a packet multiplexing transmission unit 605, while the content receiving apparatus 611 includes a packet receiving unit 618.

Figure 7:
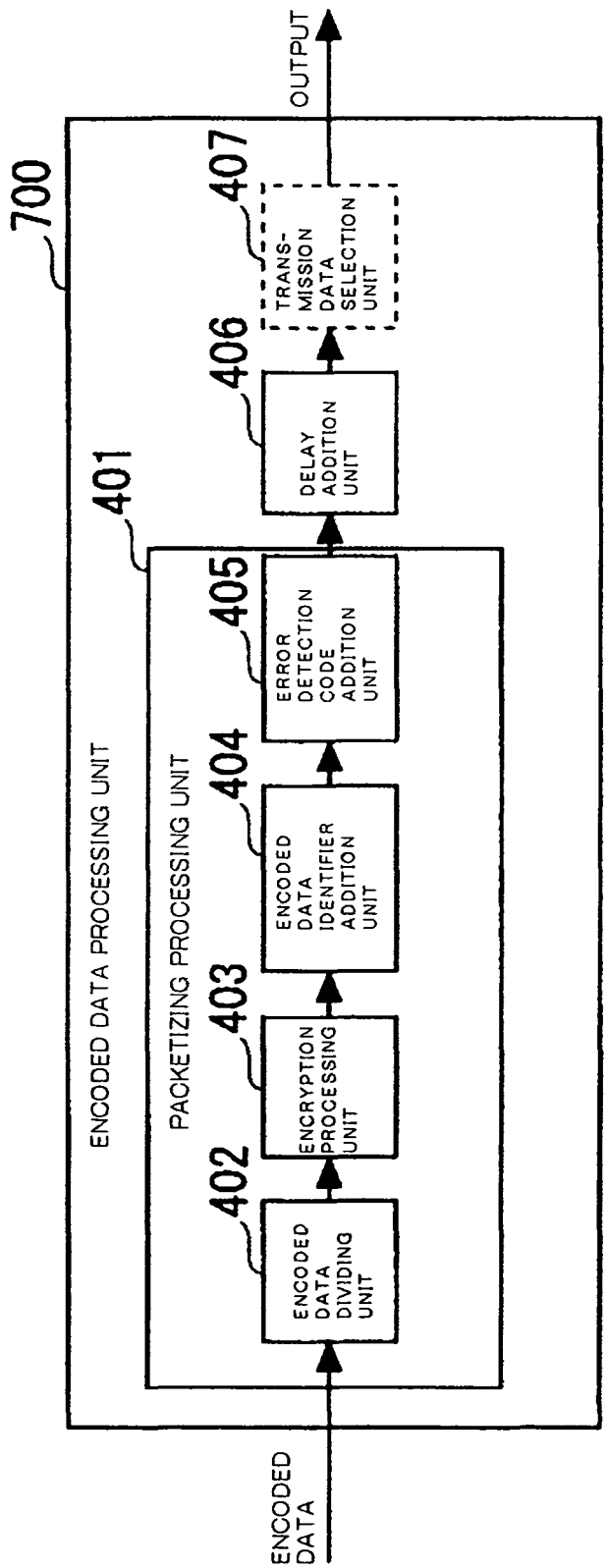
FIG. 7 is a diagram showing the configuration of an encoded data processing unit in the second, fourth, and sixth embodiments of the present invention.

FIG. 7 is a diagram showing the configuration of each of first through Nth image encoded data processing units 602 through 604 in the content distribution device 601. Referring to FIG. 7, an encoded data processing unit 700 does not include a function of the transmission unit 408 in the encoded data transmission unit 400 shown in FIG. 4.

The packet multiplexing transmission unit 605 multiplexes outputs (packets) of the first through Nth image encoded data processing units 602 through 604, and transmits image encoded data to the content receiving apparatus 611 through the transmission path 610 in one session.

The packet receiving unit 618 of the content receiving apparatus 611 receives the multiplexed (multiplexed) packet of the image encoded data from the content distribution device 601 and separates (demultiplexes) the multiplexed packet. The packet receiving unit 618 checks whether the packet is influenced by a data error in the course of transmission according to the checksum of the UDP header or the information corresponding thereto. In case the error occurs, the packet receiving unit 618 discards the packet. In case the error does not occur, the packet receiving unit 618 outputs the received packet of the image encoded data to the encoded data reconstruction unit 116.

Referring to FIG. 6, same reference numerals are assigned to elements that are the same as those in FIG. 1, which are the same as corresponding elements in the first embodiment.

In the present embodiment, outputs of the first through Nth encoded data processing units 602 through 604 are multiplexed, for transmission and reception. An arbitrary combination of outputs among the outputs of the first through Nth encoded data processing units 602 through 604 can also be multiplexed, for transmission and reception.

In the present embodiment, a description was given assuming that one packet multiplexing transmission unit 605 and one packet receiving unit 618 are provided. Even if a configuration is made in which a plurality of these units are included, the same operation and effect can be obtained. The same operation and effect can be obtained even if a configuration is made in which a plurality of transmitting and receiving units for transmitting and receiving a packet in each independent session with no medium of the packet multiplexing transmission unit 605 and the packet receiving unit 618 are included. In this case, by control over session information to be notified in the call connecting processing, a content distribution side can naturally control quality and stability of content to be reproduced for each content receiving apparatus 611.

Further, for each session for distribution, selection among the multicast or broadcast, or unicast can be of course made. At this point, the number of sessions can be controlled by power that can used by the content receiving apparatus 611.

Meanwhile, a plurality of the transmission paths may be used, so that a session for distributing the multiplexed first through Nth encoded data, information on the call connection processing, and information on the reception status report may be transmitted through the different transmission paths.

Respective functions and processing of the call connection processing unit 102, transmission management unit 103, data read unit 104, first through Nth image encoded data processing units 602 through 604, packet multiplexing transmission unit 605, and report receiving unit 108 in the content distribution device 601 may be of course implemented by program control executed by a computer constituting the content distribution device 601. Respective functions and processing of the call connection processing unit 112, encoded data reconstruction unit 116, decoder 117, and report transmission unit 118, and packet receiving unit 618 in the content receiving apparatus 611 may be of course implemented by program control executed by a computer constituting the content receiving apparatus 611.

Figure 21:
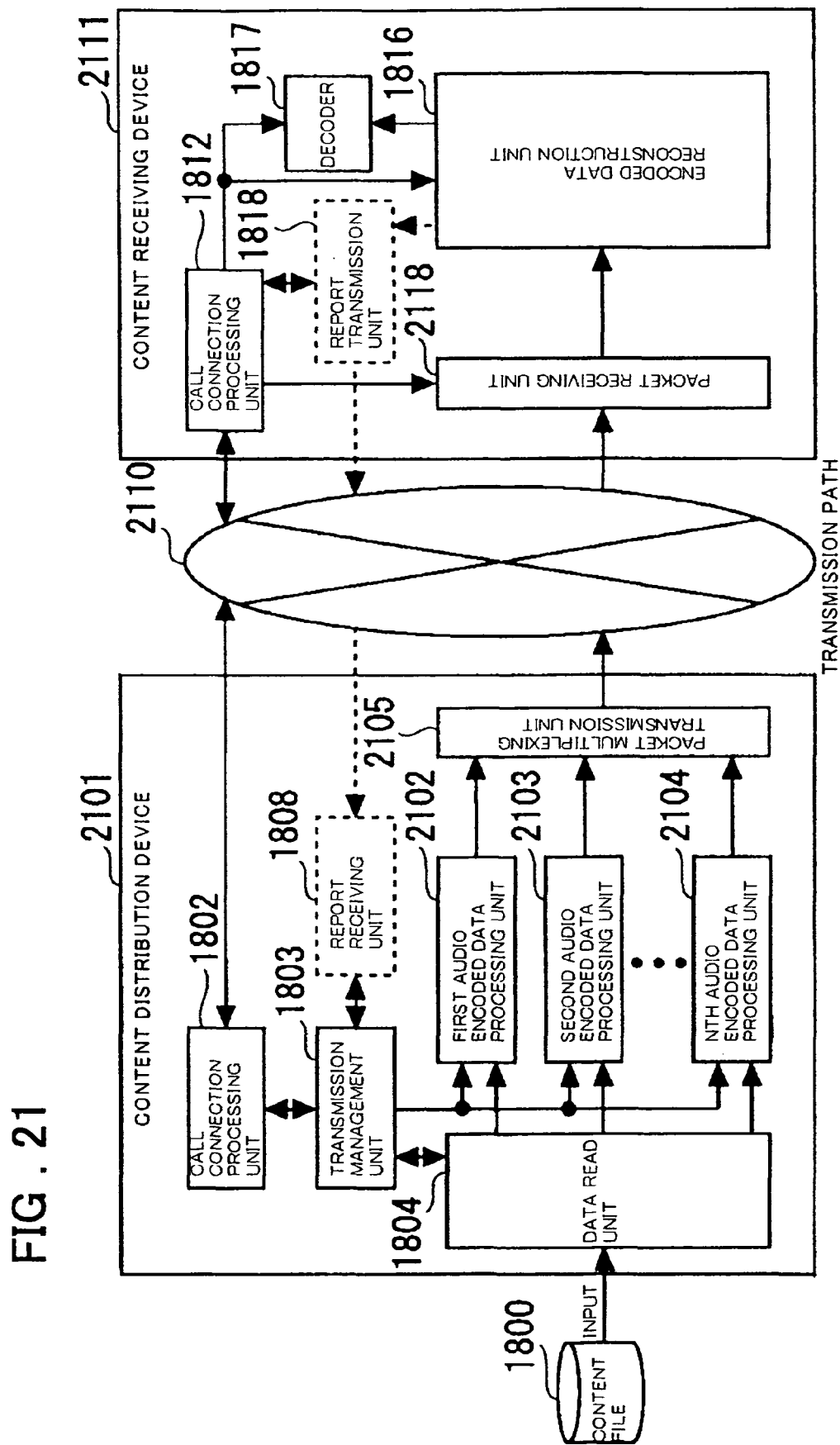
FIG. 21 is a diagram showing a variation example of the system configuration in the second embodiment of the present invention.

In the present embodiment described above, by performing the same processing on audio encoded data as well, as shown in FIG. 21, the same operation and effect can be obtained. Referring to FIG. 21, a content distribution device 2101 for distributing an audio signal includes the data read unit 1804 for reading audio data from the content file 1800, first through Nth audio encoded data processing units 2102 through 2104, a packet multiplexing transmission unit 2105, the call connection processing unit 1802, the transmission management unit 1803, and the report receiving unit 1808. A content receiving apparatus 2111 includes a packet receiving unit 2118, the encoded data reconstruction unit 1816, the decoder 1817, the call connection processing unit 1812, and the report transmission unit 1818. In this case, the same processing may be performed regarding the content file 100, content distribution device 601, transmission path 610, and content receiving apparatus 611, in FIG. 6 as the content file 1800, content distribution device 2101, transmission path 2110, and content receiving apparatus 2111 in FIG. 21, respectively.

When the content file includes both image encoded data and audio encoded data and when the content distribution device and the content receiving apparatus each include a function of processing both of the image encoded data and the audio encoded data, the operation and the effect of the present embodiment described above on both image and sound can be of course obtained.

Third Embodiment Mode of the Invention

In a third embodiment mode of the present invention, a transmission side includes means for reading at least one item of encoded data and at least one Intra-frame encoded data from a content file with M encoded data having different compression rates stored therein, first through Nth encoded data transmission means, at least one Intra-frame encoded data transmission means, and means for setting routing priority control on a transmission path for each session and setting power control on a wireless transmission path, wherein M and N are integers equal to or greater than one. The respective transmission means transmit encoded data using mutually different sessions. A reception side includes means for receiving the encoded data and the Intra-frame encoded data from at least one of the sessions, and further includes means for selecting whether to receive the encoded data from the at least one of the sessions based on an error and loss ratio of the received data and/or power that can be used by the reception side and/or a setting defined in advance. Then, the encoded data that has been received with no transmission error or no dropout is extracted, and reconstruction is performed, for decoding.

Third Embodiment

Next, a third embodiment of the present invention will be described with reference to drawings.

Figure 8:
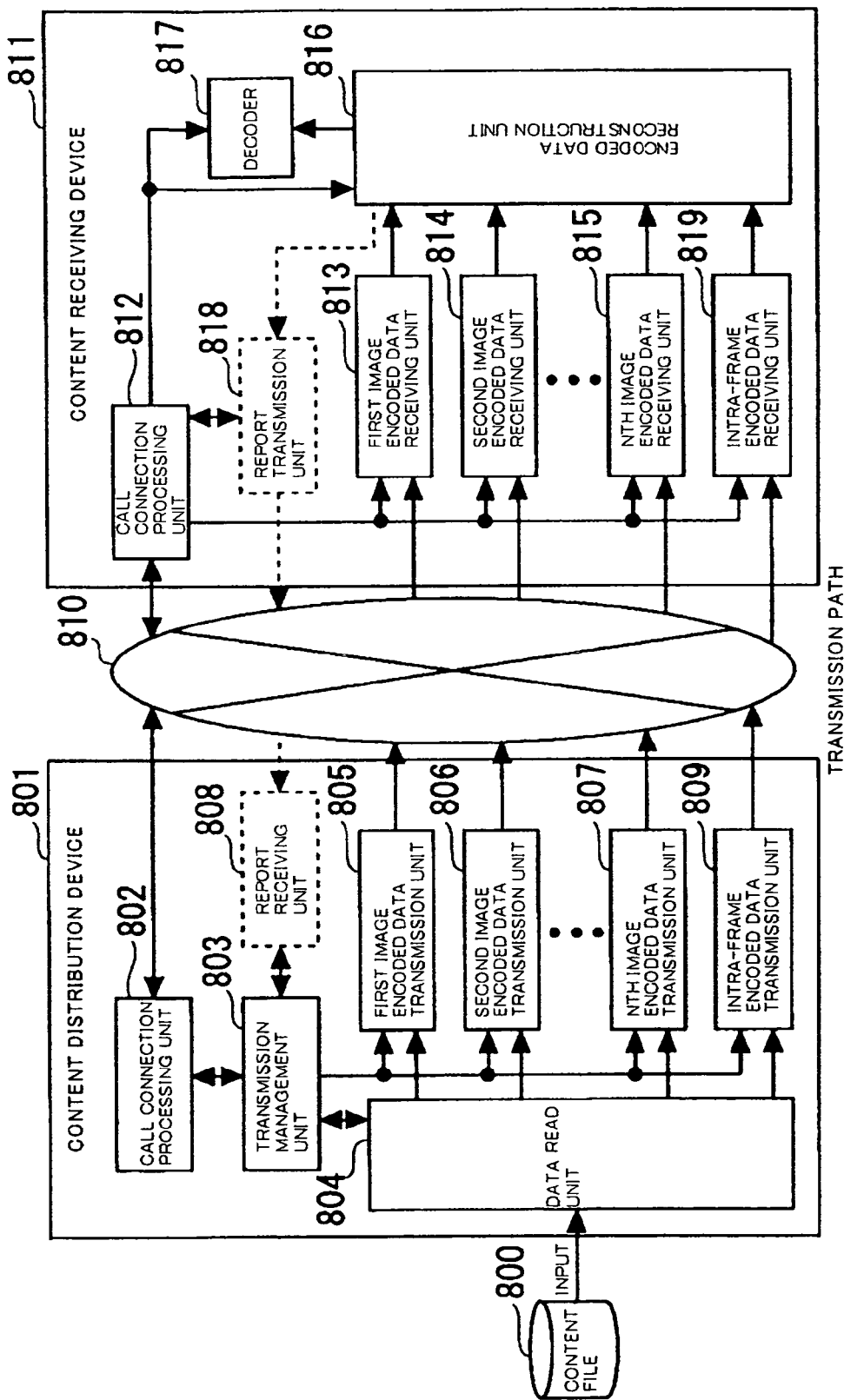
FIG. 8 is a diagram showing a system configuration in the third embodiment of the present invention.

FIG. 8 is a diagram showing the configuration of the third embodiment of the present invention. A content distribution device 801, a content receiving apparatus 811, and a transmission path 810, in FIG. 8 correspond to the content distribution device 101, content receiving apparatus 111, and transmission path 110, in FIG. 1 showing the first embodiment, respectively. Elements indicated by reference numerals 802 through 808 and 812 through 818 correspond to the elements indicated by reference numerals 102 through 108 and 112 through 118, in FIG. 1, respectively. The present embodiment will be described below, focusing on a difference from the first embodiment. Meanwhile, in the present embodiment, for simplicity of the description, the number of Intra-frame encoded data to be distributed is set to "one". The number of the Intra-frame encoded data is not of course limited to one.

Like the content file 100 in FIG. 1, a content file 800 becomes the content file that includes:

(A1) data that have been encoded with different M compression rates (rates), or (A2) data that has been Intra-frame encoded, in addition to these. In a case of (A1), the image encoding device 200 (refer to FIG. 2) described in the first embodiment creates the content file. An image encoding system that creates the content file in a case of (A2) will be described using FIG. 9.

Figure 9:
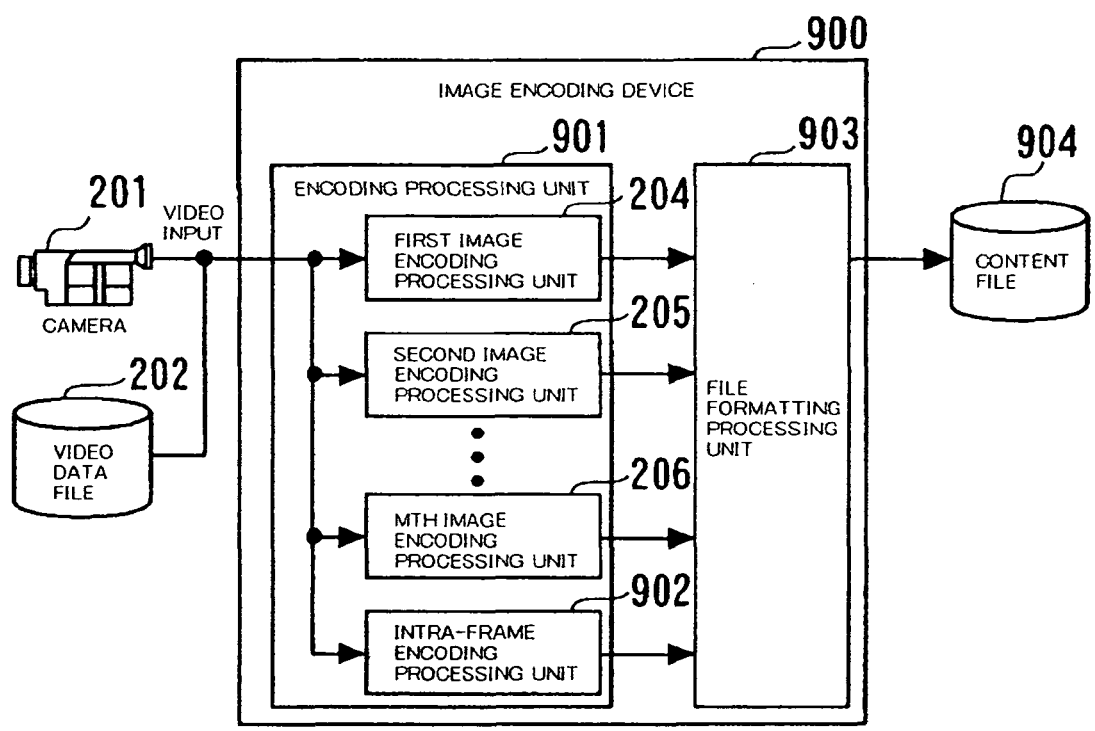
FIG. 9 is a diagram showing the configuration of an image encoding device in the third and fourth embodiments of the present invention.

Referring to FIG. 9, as in the first embodiment, an image encoding device 900 inputs a video signal from the camera 201 or video information from the video data file 202, and the first through Mth image encoding processing units 204 through 206 perform encoding processing with predetermined compression rates, respectively, as in the first embodiment. Further, an Intra (Intra)-frame encoding processing unit 902 performs Intra-frame encoding, thereby encoding the input video information. It is assumed that the encoding processing herein is performed using the same encoding method and the same image size. In the first through Mth encoding processing units 204 through 206, encoding is performed using the same frame configuration, same frame rate, and same Intra-frame interval. Encoding is performed so that the encoding unit of encoded data becomes the data obtained by encoding the same frame and the same region of input video.

When the MPEG-4 scheme is used as the encoding scheme, for example, video packets, which are the encoding units generated by the first through Mth image encoding processing units 204 through 206 and the Intra-frame encoding processing unit 902, respectively correspond to the encoded data obtained by encoding the same region of the same frame at the respective compression rates, respectively.

The encoded data are converted into a file according to a predetermined file format at a file formatting processing unit 903 and are output as a content file 904. As the file format standard, the MP4 file format, the 3GP file format, or the like, for example, is employed. In this case, the first through Mth image encoded data and intra-frame encoded data are written onto first through Mth tracks, respectively, each together with a hint track, so that each video packet becomes a sample for each of the tracks.

Figure 10:
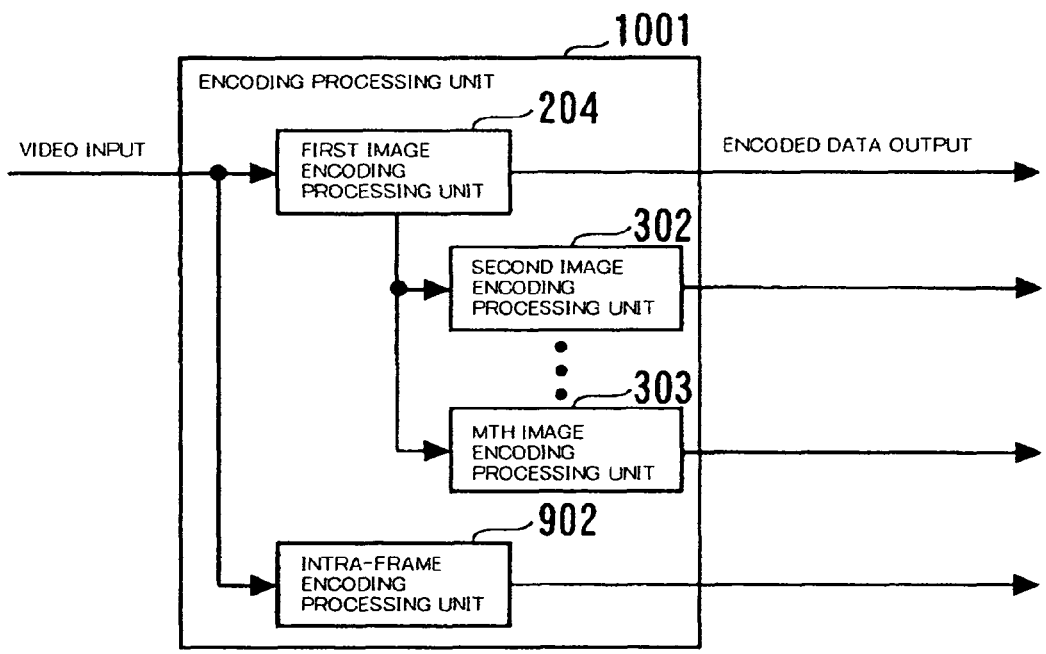
FIG. 10 is a diagram showing the configuration of an encoding processing unit in the third and fourth embodiments of the present invention.

Like an encoding processing unit 1001 shown in FIG. 10, an encoding processing unit 901 in FIG. 9 may use a method, as in FIG. 3 in the first embodiment, in which the second through Mth encoding processing units 302 through 303 perform the encoding processing by reusing the encoding parameter such as the motion vector obtained at a time of the encoding processing at the first image encoding processing unit 204 and output the encoded data.

As described above, by filing processed data in advance, a burden on the processing on a distribution side can be more greatly reduced than in a case where the rate conversion and the Intra-frame encoding have been performed on respective streams of contents when the contents are distributed.

A transmission management unit 803 in FIG. 8 sets at least one of:

(A) compression rate (content track) and type of encoded data read by a data read unit 804

(B) transmission destination addresses and port numbers for transmission by first through Nth transmission units 805 through 807 and an Intra-frame encoded data transmission unit 809

(C) identification information on the encoded data to be transmitted by the first through Nth transmission units 805 through 807 and the Intra-frame encoded data transmission unit 809

(D) presence or absence of encryption of the encoded data to be transmitted by the first through Nth transmission units 805 through 807 and the Intra-frame encoded data transmission unit 809

(E) encryption key data on the encoded data to be transmitted by the first through Nth transmission units 805 through 807 and the Intra-frame encoded data transmission unit 809

(F) a transmission time difference or interleave setting of the encoded data to be transmitted by the first through Nth transmission units 805 through 807 and the Intra-frame encoded data transmission unit 809

(G) a selection criterion for the encoded data to be transmitted by the first through Nth transmission units 805 through 807 and the Intra-frame encoded data transmission unit 809

(H) routing priority in a session to be transmitted by the first through Nth transmission units 805 through 807 and the Intra-frame encoded data transmission unit 809 and/or transmission power when the wireless transmission path is used. Based on this, connection processing is performed between a call connection processing unit 802 and a call connection processing unit 812 of the content receiving apparatus 811 using the RTSP/SDP or the like, for example. All of these can also be set in advance between the content distribution device 801 and the content receiving apparatus 811, and content can also be transmitted and received.

When the data read unit 804 reads image encoded data from the content file with at least one Intra-frame encoded data contained in one track thereof based on the setting at the transmission management unit 803, and/or the setting set in advance between the content distribution device 801 and the content receiving apparatus 811, the data read unit 804 reads the image encoded data from the respective tracks of the content file 800, for output to the first through Nth image encoded data transmission units 805 through 807 and the Intra-frame encoded data transmission unit 809.

Alternatively, when the data read unit 804 reads encoded data from the content file 100 in the first embodiment described before that does not include Intra-frame encoded data as one track, the data read unit 804 may read only Intra-frame encoded data from one of the first through Mth tracks, for output to the Intra-frame encoded data transmission unit 809.

In either case, the image encoded data read from the same track may be output to a plurality of the image encoded data transmission units.

Like the first through Nth image encoded data transmission units 805 through 807, the Intra-frame encoded data transmission unit 809 in FIG. 8 performs the same processing as that shown in FIG. 4 in the first embodiment.

The payload type of the RTP header, the SSRC, the CSRC or the identification information corresponding thereto is added to the Intra-frame encoded data as well so that identification from the first through Nth encoded data can be performed.

Next, the call connection processing unit 812 exchanges at least one of the following data with the call connection processing unit 802 of the content distribution device 801 through the transmission path 810, thereby performing call establishment:

(A) an address of the content receiving apparatus 811

(B) reception port numbers of the first through Nth receiving units 813 through 815 and an Intra-frame encoded data receiving unit 819

(C) correspondences between compression rates of encoded data received by the first through Nth receiving units 813 through 815 and the Intra-frame encoded data receiving unit 819 and the type of the encoded data, and the identification information added to packets (D) presence or absence of encryption of the encoded data received by the first through Nth receiving units 813 through 815 and the Intra-frame encoded data receiving unit 819

(E) encryption key data of the encoded data received by the first through Nth receiving units 813 through 815 and the Intra-frame encoded data receiving unit 819

(F) a time difference or interleave setting between the encoded data received by the first through Nth receiving units 813 through 815 and the Intra-frame encoded data receiving unit 819

(G) a receive buffer size based on the time difference or the interleave setting between the encoded data received by the first through Nth receiving units 813 through 815 and the Intra-frame encoded data receiving unit 819

(H) a transmission port number for the reception status report (I) an encoding option (tool to be used) of the encoded data (J) a payload option of the encoded data Like the first through Nth image encoded data receiving units 813 through 815, the Intra-frame encoded data receiving unit 819 checks whether a received packet is influenced a data error in the course of transmission according to the checksum of the UDP header or the information corresponding thereto. In case the error occurs, the Intra-frame encoded data receiving unit 819 discards the packet. In case the error does not occur, the Intra-frame encoded data receiving unit 819 outputs the packet to an encoded data reconstruction unit 816.

The encoded data reconstruction unit 816 has the same configuration as that in FIG. 5 in the first embodiment. However, when any encoded data has been influenced by the error on the transmission path or lost, Intra-frame encoded data is selected for the same region of a frame subsequent to the frame of the region of an encoded image of the encoded data. Then, quality deterioration of a decoded image can be minimized. Further, even when one of the first through Nth encoded data can be accurately received, for example, assume that it is Inter-frame encoded data. Then, if the Intra-frame encoded data is always selected periodically, the same operation and effect as that for a CIR (Cyclic Intra Refresh) of the MPEG-4 encoding scheme can be obtained even when the error on the transmission path or the loss is generated. Quick recovery from a disturbance in a decoded image can be obtained, so that the quality deterioration can be more reduced.

When the content receiving apparatus 111 is used in the power-limited environment, such as the one operated by the battery/cell, and/or when the reception environment is satisfactory and image encoded data with a low compression rate can be received with little error or dropout, reception of a session for distributing Intra-frame encoded data or image encoded data with a high compression rate may be stopped. The usage time of the device is thereby increased as much as possible. On the contrary, when the large-capacity battery or the AC power source is connected, the number of sessions for receiving image encoded data may be increased. Whether to perform data reception or not may be controlled as described above according to the available power or the reception environment.

Alternatively, it may be so arranged that a recipient can set the number of these image data to be received in the image data reception device 811.

Except for this, elements are the same as corresponding respective portions in the first embodiment.

Meanwhile, a plurality of the transmission paths may be used, so that a session for distributing a multiplexed output of the first through Nth transmission units, a session for distributing an output of the Intra-frame encoded data transmission unit, information on the call connecting processing, and information on the reception status report may be transmitted through the different transmission paths.

Respective functions and processing of the call connection processing unit 802, transmission management unit 803, data read unit 804, first through Nth transmission units 805 through 807, report receiving unit 808, and Intra-frame encoded data transmission unit 809 in the content distribution device 801 may be of course implemented by program control executed by a computer constituting the content distribution device 801. Respective functions and processing of the call connection processing unit 812, first through Nth receiving units 813 through 815, encoded data reconstruction unit 816, a decoder 817, a report transmission unit 818, and the Intra-frame encoded data receiving unit 819 in the content receiving apparatus 811 may be of course implemented by program control executed by a computer constituting the content receiving apparatus 811.

Fourth Embodiment Mode of the Invention

In a fourth embodiment mode of the present invention, a transmission side includes means for reading at least one item of encoded data and at least one Intra-frame encoded data from a content file with M encoded data having different compression rates stored therein, first through Nth encoded data processing means, at least one Intra-frame encoded data processing means, and means for multiplexing outputs of the first through Nth encoded data processing means and an output of Intra-frame encoded data, for transmission, wherein M and N are integers equal to or greater than one. The transmission side transmits the multiplexed encoded data using at least one session. A reception side includes means for receiving the multiplexed encoded data from the at least one session. Then, the encoded data that has been received with no transmission error or no dropout is extracted, and reconstruction is performed, for decoding.

Fourth Embodiment

Next, a fourth embodiment of the present invention will be described with reference to drawings.

Figure 11:
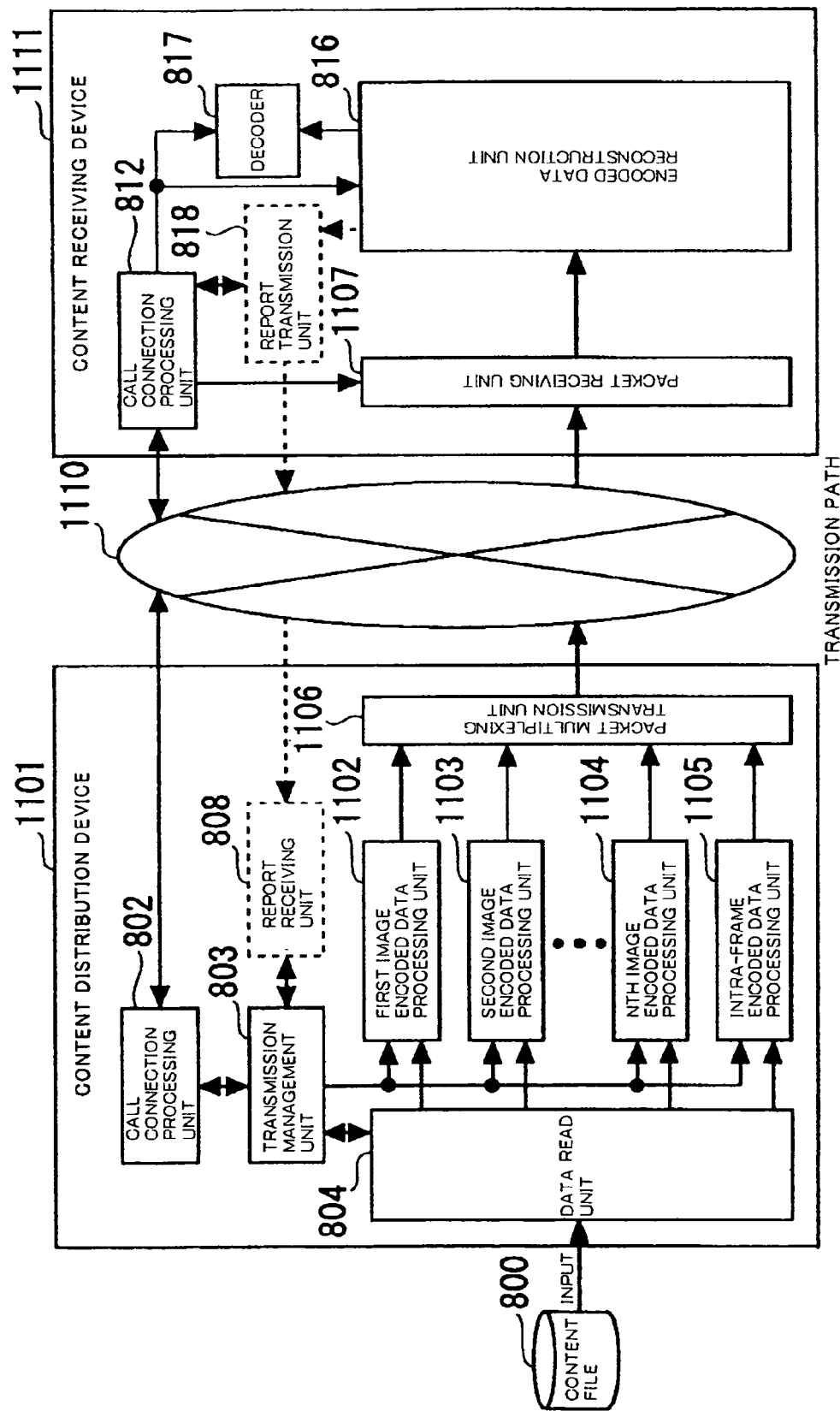
FIG. 11 is a diagram showing a system configuration in the fourth embodiment of the present invention.

FIG. 11 is a diagram showing the configuration of the fourth embodiment of the present invention. A content distribution device 1101, a content receiving apparatus 1111, and a transmission path 1110 in FIG. 11 correspond to the content distribution device 801, content receiving apparatus 811, and transmission path 810 in FIG. 8, respectively. Only a difference between the present embodiment and the third embodiment in FIG. 8 will be described.

First through Nth image encoded data processing units 1102 through 1104 of the content distribution device 1101 and an Intra-frame encoded data processing unit 1105 are configured in the same manner as the encoded data processing unit 700 shown in FIG. 7, and each becomes the one that does not include the function of the transmission unit 408 in each of the first through Nth image encoded data transmission units 805 through 807 and the Intra-frame encoded data transmission unit 809 in the third embodiment having the configuration as shown in FIG. 4.

A packet multiplexing transmission unit 1106 multiplexes outputs (packets) of the first through Nth image encoded data processing units 1102 through 1104 and the Intra-frame encoded data processing unit 1105, and transmits image encoded data to the content receiving apparatus 1111 through the transmission path 1110 in one session.

A packet receiving unit 1107 of the content receiving apparatus 1111 receives a packet of the image encoded data from the content distribution device 1101, checks whether the packet is influenced by a data error in the course of transmission according to the checksum of the UDP header or the information corresponding thereto. In case the error occurs, the packet receiving unit 1107 discards the packet. In case the error does not occur, the packet receiving unit 1107 outputs the packet to the encoded data reconstruction unit 816.

Except for this, elements are the same as corresponding respective portions in the third embodiment.

In the present embodiment, the outputs of the first through Nth image encoded data processing units and the Intra-frame encoded data processing unit are multiplexed for transmission and reception. An arbitrary combination of the outputs of these encoded data processing units can also be multiplexed for transmission and reception.

In the present embodiment, a description was given, assuming that there is one packet multiplexing transmission unit and one packet receiving unit. Even if a plurality of these units is present, the same operation and effect can be obtained. Further, even if a plurality of transmitting and receiving units each for transmitting and receiving a packet in an independent session not through the medium of the packet multiplexing transmission unit and the packet receiving unit is present, the same operation and effect can be obtained.

Figure 12:
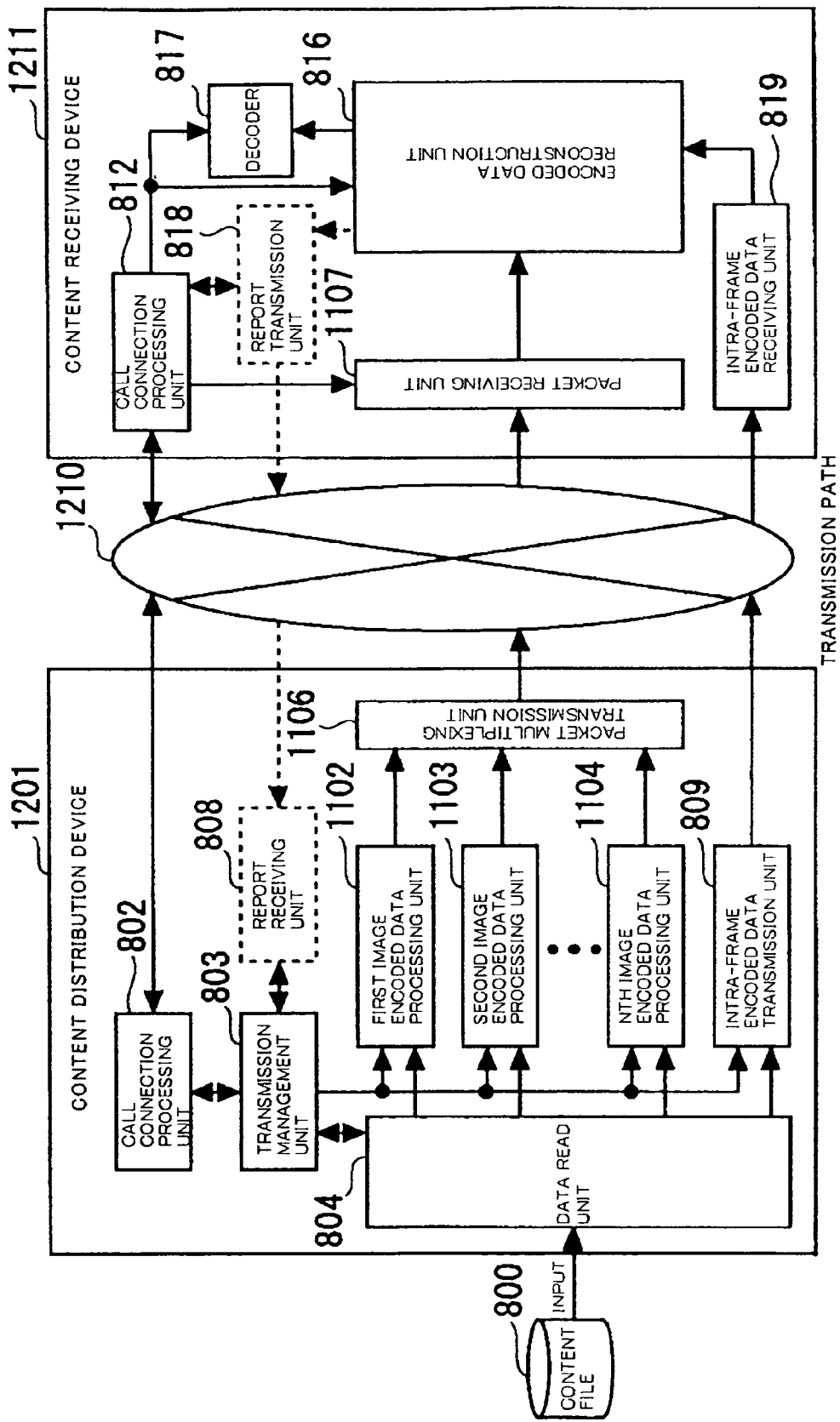
FIG. 12 is a diagram showing a variation example of the system configuration in the fourth embodiment of the present invention.

The embodiment in which the outputs of the first through Nth image encoded data processing units 1102 through 1104 are multiplexed for transmission and reception in a session, and Intra-frame encoded data is transmitted and received in a session different from that session, for example, becomes a configuration as shown in FIG. 12. In a case of the configuration shown in FIG. 12, the quality and stability of content to be reproduced for each content receiving apparatus 1211 can be of course controlled on a content distribution side by the control over the session information to be notified in call connection processing as in the first embodiment and the third embodiment.

Selection among the multicast, broadcast, or unicast can be as a matter of course made on a session basis to be distributed. In this case, the number of the sessions to be received can be as a matter of course controlled by power that can be utilized by the content receiving apparatus 1211.

Meanwhile, a plurality of the transmission paths may be used, and sessions for distributing the multiplexed first through Nth encoded data and the multiplexed Intra-frame encoded data, the information on the call connection processing, and the information on the reception status report may be transmitted through the different transmission paths.

Respective functions and processing of the call connection processing unit 802, transmission management unit 803, data read (data read/generation/conversion) unit 804, first through Nth image encoded data processing units 1102 through 1104, Intra (Intra)-frame encoded data processing unit 1105, packet multiplexing transmission unit 1106, and report receiving unit 808 in the content distribution device 1101 may be of course implemented by program control to be executed by a computer constituting the content distribution device 1101. Respective functions and processing of the call connection processing unit 812, encoded data reconstruction unit 816, decoder 817, report transmission unit 818, packet receiving unit 1107 in the content receiving apparatus 1111 may be of course implemented by program control implemented by a computer constituting the content receiving unit 1111.

Respective functions and processing of the call connection processing unit 802, transmission management unit 803, data read unit 804, first through Nth image encoded data processing units 1102 through 1104, Intra (Intra)-frame encoded data transmission unit 809, packet multiplexing transmission unit 1106, and report receiving unit 808 in a content distribution device 1201 may be of course implemented by program control to be executed by a computer constituting the content distribution device 1201. Respective functions and processing of the call connection processing unit 812, encoded data reconstruction unit 816, decoder 817, report transmission unit 818, Intra-frame encoded data receiving unit 819, packet receiving unit 1107 in the content receiving apparatus 1211 may be of course implemented by program control implemented by a computer constituting the content receiving unit 1211.

Fifth Embodiment Mode of the Invention

In a fifth embodiment mode of the present invention, a transmission side includes means for reading at least one item of encoded data and at least one item of error correction code data from a content file with M encoded data having different compression rates stored therein, first through Nth encoded data transmission means, and at least one error correction code data transmission means, and further includes means for setting routing priority control on a transmission path for each session and power control on a wireless transmission path, wherein M and N are integers equal to or greater than one. Respective transmission means transmit encoded data using sessions mutually different to one another. A reception side includes means for receiving the encoded data and the error correction code data from at least one of the sessions, and further includes means for selecting whether to receive the encoded data from the at least one session based on a received data error and loss rate and/or power that can be used by the reception side and/or a setting set in advance. The encoded data that has been received with no transmission error or no dropout is extracted. When the transmission error or the dropout is present in the encoded data, proper data is restored using the error correction code data, thereby reconstructing the encoded data, for decoding.

Fifth Embodiment

Next, a fifth embodiment of the present invention will be described with reference to drawings.

Figure 13:
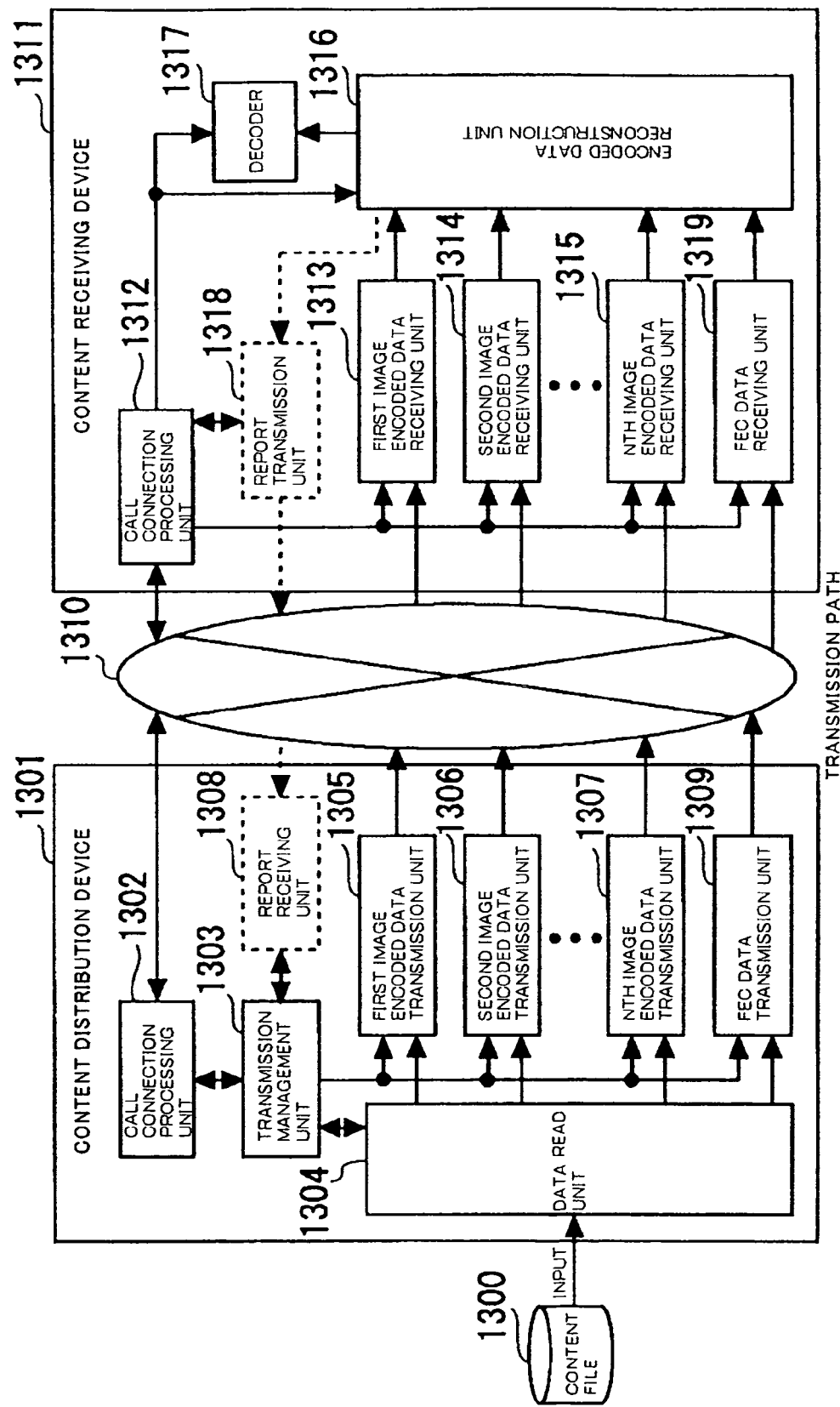
FIG. 13 is a diagram showing a system configuration in the fifth embodiment of the present invention.

FIG. 13 is a diagram showing the configuration of the fifth embodiment of the present invention. A content distribution device 1301, a content receiving apparatus 1311, and a transmission path 1310 in FIG. 13 correspond to the content distribution device 101, content receiving apparatus 111, and transmission path 110 in FIG. 1, shown in the first embodiment, respectively. Reference numerals 1302 through 1308 and reference numerals 1312 through 1318 correspond to reference numerals 102 through 108 and reference numerals 112 through 118 in FIG. 1, respectively. A description will be given about the present embodiment below, centering on the difference from the first embodiment. Meanwhile, for simplicity of the description, in the present embodiment, the one item of error correction code data generated from first image encoded data is used. The error correction code data may be of course a plurality of error correction code data generated from arbitrary data of second through Nth image encoded data. Alternatively, not only the error correction code data but also the Intra-frame encoded data may be of course combined, for distribution, as shown in the third embodiment.

Like the content file 100, a content file 1300 has become the content file that includes data encoded at different M compression rates (rates), and in addition to that, includes at least one item of error correction code data for the M encoded data.

Figure 14:
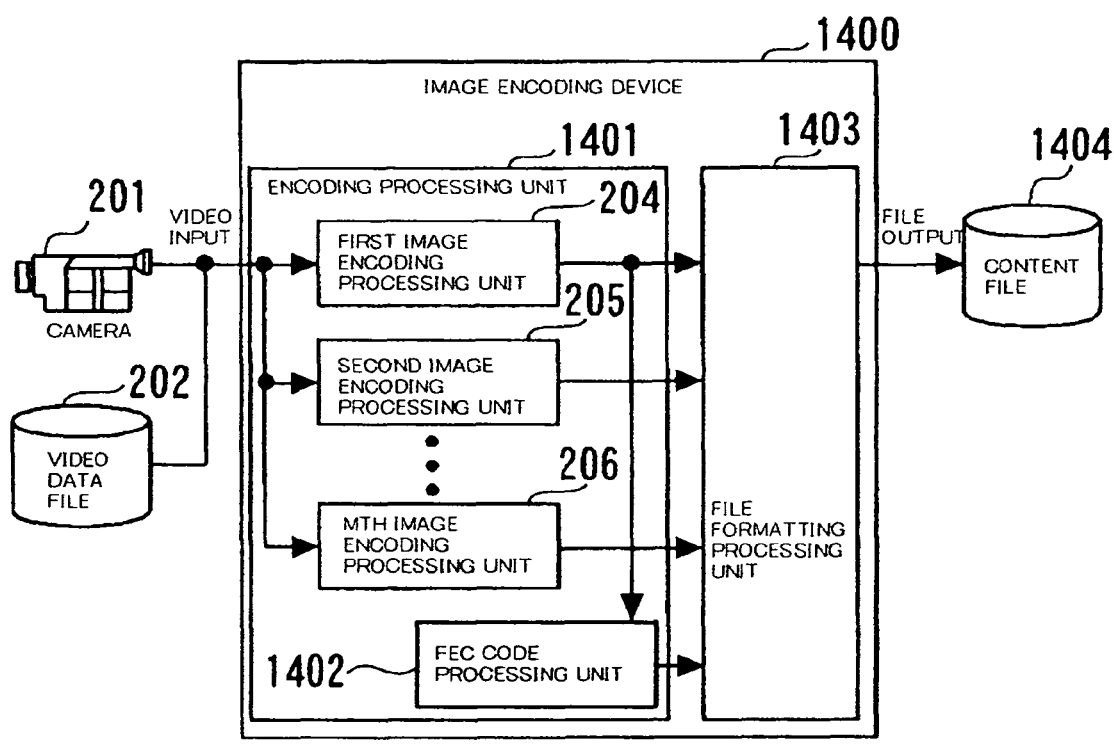
FIG. 14 is a diagram showing the configuration of an image encoding device in the fifth and sixth embodiments of the present invention.

FIG. 14 is a diagram showing the configuration of an image encoding device that generates the content file 1300. An image encoding device 1400 will be described, using FIG. 14.

As in the first embodiment in FIG. 2, the image encoding device 1400 inputs a video signal from the camera 201 or video information from the video data file 202, and performs the same encoding processing as in the first embodiment, by the first through Mth image encoding processing units 204 through 206.

Further, an error correction code is generated from the first image encoded data by an FEC code processing unit 1402.

As the code for error correction referred to as "FEC (Forwards Error Correction)", a Reed Solomon code, an LDPC (Low Density parity check) code, a convolution code, and the like are present. In the present invention, these known approaches are employed.

Encoded data and error correction code data are converted into a file by a file formatting processing unit 1403 according to a predetermined file format and output as a content file 1404. As a file format standard, the MP4 file format, the 3GP file format, or the like is present. In that case, the first through Mth image encoded data and the error correction code data are written onto first through (M+1)th tracks each together with a hint track, so that each video packet or the error correction code data become samples for each of the tracks.

Figure 15:
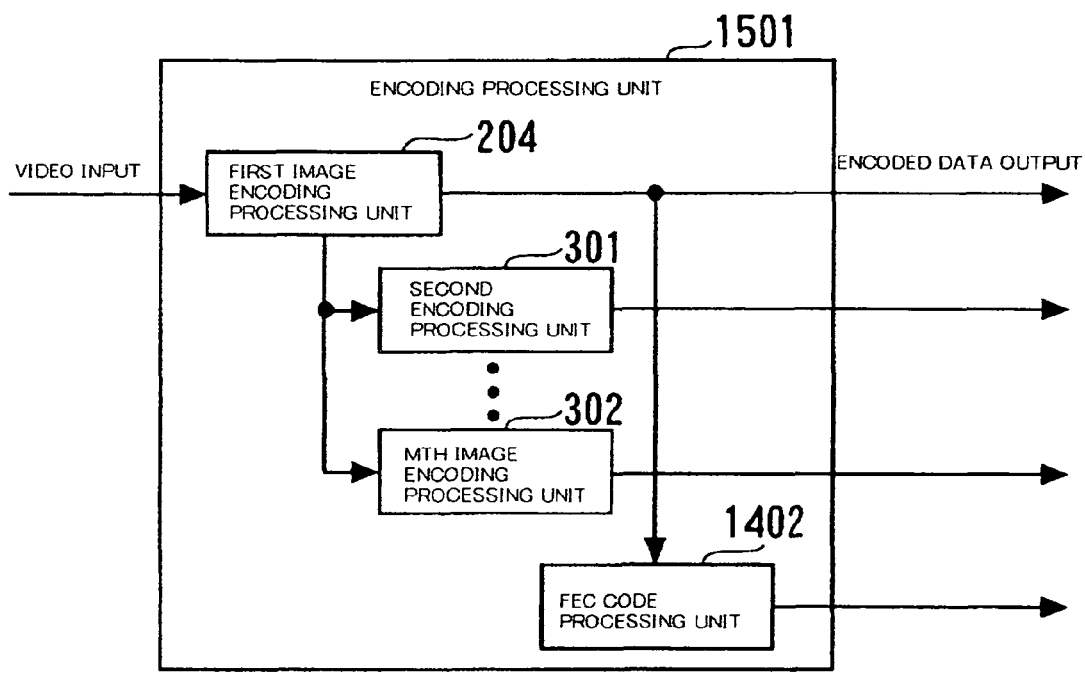
FIG. 15 is a diagram showing the configuration of an encoding processing unit in the fifth and sixth embodiments of the present invention.

An encoding processing unit 1401 in FIG. 14 may be constituted, like an encoding processing unit 1501 shown in FIG. 15. That is, as in FIG. 3 in the first embodiment, a method may be used in which the second through Mth encoded processing units 302 through 303 shown in FIG. 15 reuse the encoding parameter such as the motion vector obtained in encoding processing by the first image encoding processing unit 204 to perform encoding processing, and output the encoded data.

In the present embodiment, the error correction code data is generated from the first image encoded data. One or more error correction code data may be generated from arbitrary data of the first through Mth image encoded data and may be written onto different tracks, respectively. On this occasion, generation of the error correction code data from the image encoded data having a lower compression rate and higher image quality is preferable for maintaining quality of an image to be reproduced on the reception side.

As described above, processed data is stored in a file in advance. Thus, when content is distributed, a burden on processing on a distributing side can be thereby reduced more greatly than in a case where the rate conversion and generation of the error correction code data are performed on each of streams of the contents.

A transmission management unit 1303 sets at least one of:
(A) compression rate (content track) and type of encoded data to be read by a data read unit 1304
(B) transmission destination addresses and port numbers for transmission by first through Nth transmission units 1305 through 1307 and an FEC data transmission unit 1309
(C) identification information on the encoded data to be transmitted by the first through Nth transmission units 1305 through 1307 and the FEC data transmission unit 1309
(D) presence or absence of encryption of the encoded data to be transmitted by the first through Nth transmission units 1305 through 1307 and the FEC data transmission unit 1309
(E) encryption key data of the encoded data to be transmitted by the first through Nth transmission units 1305 through 1307 and the FEC data transmission unit 1309
(F) a transmission time difference or interleave setting of the encoded data to be transmitted by the first through Nth transmission units 1305 through 1307 and the FEC data transmission unit 1309
(G) a selection criterion of the encoded data to be transmitted by the first through Nth transmission units 1305 through 1307 and the FEC data transmission unit 1309
(F) routing priority in a session to be transmitted by the first through Nth transmission units 1305 through 1307 and the FEC data transmission unit 1309 and/or transmission power on the wireless transmission path. Based on this, the connection processing is performed between the call connection processing unit 1302 and the call connection processing unit 1312 of the content receiving unit 1311 according to the RTSP (Real Time Streaming Protocol)/SDP (Session Description Protocol) or the like, for example. Meanwhile, all of these data can also be set between the content distribution device 1301 and the content receiving apparatus 1311 in advance, and a content can also be transmitted and received.

The data read unit 1304 reads the image encoded data and the error correction code data from the content file with at least one item of error correction code data stored in one track thereof based on settings in the transmission management unit 1303 and/or settings set between the content distribution device 1301 and the content receiving apparatus 1311 in advance, and outputs the read-in data to the first through Nth image encoded data transmission units 1305 through 1307 and the FEC (Forward Error Correction) data transmission unit 1309. In this case, the image encoded data read in from the same track may be output to a plurality of the image encoded data transmission units.

Like the first through Nth image encoded data transmission units 1305 through 1307, the FEC data transmission unit 1309 performs processing that is the same as that in FIG. 4 in the first embodiment described before. Meanwhile, to the error corrected code data as well, the payload type of the RTP header, SSRC, CSRC, or identification information corresponding thereto is added, thereby enabling identification from the first through Nth encoded data.

Next, the call connection processing unit 1312 in the content receiving apparatus 1311 exchanges at least one of the following data with the call connection processing unit 1302 of the content distribution device 1301 through the transmission path 1310, thereby performing call establishment:

(A) an address of the content receiving apparatus 1311

(B) reception port numbers of the first through Nth receiving units 1313 through 1315 and the FEC data receiving unit 1319

(C) correspondences between the compression rates of the encoded data received by the first through Nth receiving units 1313 through 1315 and the FEC data receiving unit 1319, the type of the encoded data, and the identification information added to packets (D) presence or absence of encryption of the encoded data received by the first through Nth receiving units 1313 through 1315 and the FEC data receiving unit 1319

(E) encryption key data of the encoded data received by the first through Nth receiving units 1313 through 1315 and the FEC data receiving unit 1319

(F) a time difference or interleave setting between the encoded data received by the first through Nth receiving units 1313 through 1315 and the FEC data receiving unit 1319

(G) a receive buffer size based on the time difference or the interleave setting between the encoded data received by the first through Nth receiving units 1313 through 1315 and the FEC data receiving unit 1319

(H) a transmission port number for the reception status report (I) an encoding option (tool to be used) of the encoded data (J) a payload option of the encoded data.

Like the first through Nth receiving means 1313 through 1315, the FEC data receiving unit 1319 checks whether a received packet is influenced by a data error in the course of transmission according to the checksum of the UDP header or the information corresponding thereto. In case the error occurs, the FEC data receiving unit 1319 discards the packet. In case the error does not occur, the FEC data receiving unit 1319 outputs the packet to an encoded data reconstruction unit 1316.

Figure 27:
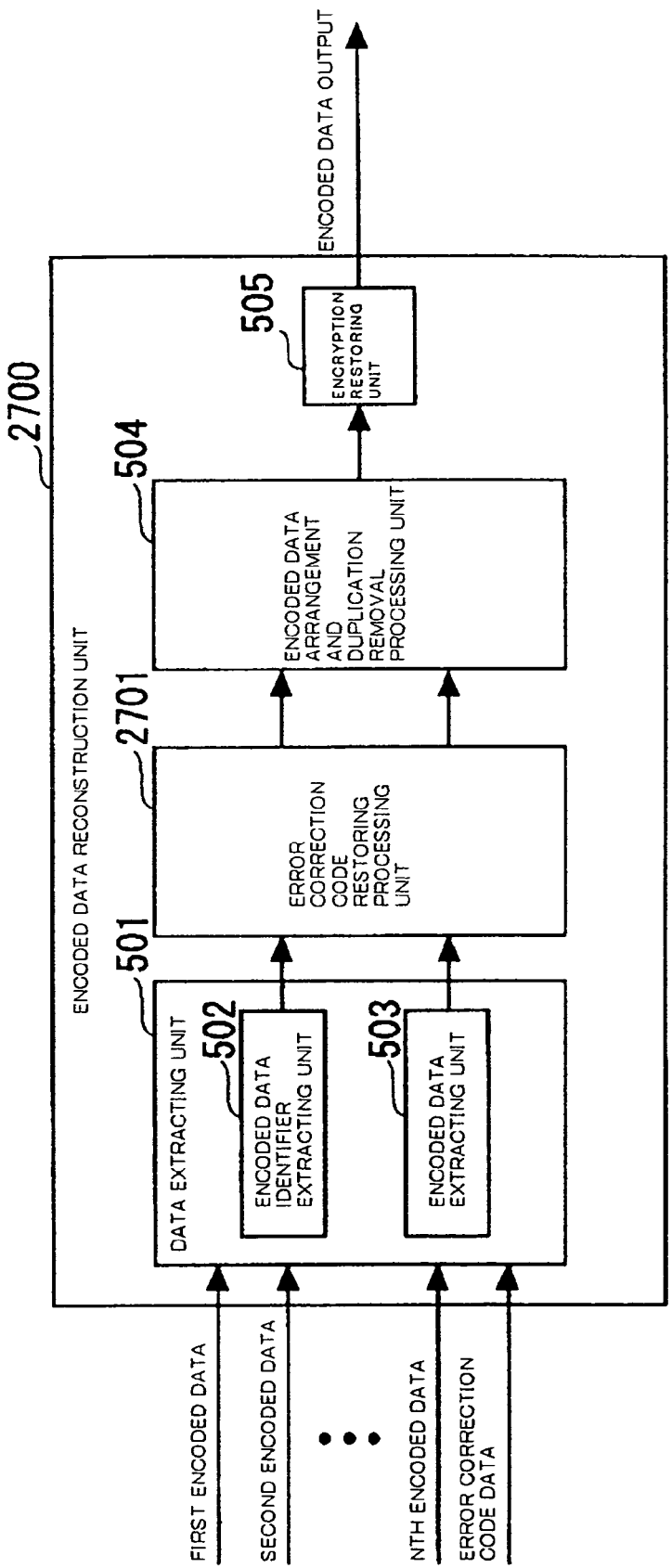
FIG. 27 is a diagram showing the configuration of the encoding data reconstruction unit in a content receiving apparatus in the fifth and sixth embodiments of the present invention.

FIG. 27 shows a configuration of the encoded data reconstruction unit 1316 in FIG. 13 as an encoded data reconstruction unit 2700. Referring to FIG. 27, the encoded data reconstruction unit 2700 is constructed by adding a function obtained by an error correction code restoring processing unit 2701 to the encoded data reconstruction unit 500 shown in FIG. 5. When an output of the data extracting unit 501 has a dropout caused by an error or a loss in data on a transmission path, the error correction code restoring processing unit 2701 uses the error correction code to restore the data, for output to the encoded data alignment and duplication removal processing unit 504. Thereafter, including a case where the restoration cannot be performed, alignment of received encoded data and double reception of encoded data transmitting units are determined based on encoded data identification information as in the first embodiment described before. When the double reception on an encoded data transmitting unit basis is found, the compression rates of the data are identified according to the identification information and/or received sessions. Preferably, data with a lowest compression rate is selected to be reconstructed into one encoded data.

When the content receiving apparatus 1311 is used in the power-limited environment, operated by the battery/cell, and/or when the reception environment is satisfactory and image encoded data with a low compression rate can be received with little error or dropout, reception of a session for distributing error correction code data or image encoded data with a high compression rate is stopped. The usage time of the device is thereby elongated as much as possible. On the contrary, when the large-capacity battery or the AC power source is connected, the number of sessions for receiving image encoded data may be increased. Whether to receive the data may be controlled as described above according to the available power and the reception environment. Alternatively, it may be so arranged that a recipient can set the number of the data to be received in the image data reception device 1311.

When a plurality of error correction code data are used, the respective error correction code data are generated according to some patterns of errors or losses on the transmission path. Then, by restoring data that has become erroneous/lost on the transmission path using the error correction code data that is most suited to the reception environment by the content receiving apparatus 1311, encoded data of an original content can also be obtained with a higher probability. In this case, the call connection processing unit 1302 of the content distribution device 1301 should notify to the call connection processing unit 1312 of the content receiving apparatus 1311 a status of the transmission path to which each of the error correction code data is suited. Alternatively, the call connection processing unit 1302 should notify a setting (such as an inspection matrix in an LDPC method or setting information for generating this) for generating the error correction code data, or should set this between the content distribution device 1301 and the content receiving apparatus 1311.

Further, when a plurality of the error correction code data are employed, different types of error correction codes may be used, and error correction code data capable of being decoded according to the reception environment and processing capability of the content receiving apparatus 1311. In this case, the call connection processing unit 1302 of the content distribution device 1301 should notify the types of the respective error correction codes to the call connection processing unit 1312 of the content receiving apparatus 1311, or should set this between the content distribution device 1301 and the content receiving apparatus 1311 in advance.

Except for this, elements are the same as the corresponding respective portions in the first embodiment.

Meanwhile, a plurality of the transmission paths may be used, and a session for distributing a multiplexed output of the first through Nth transmission units, a session for distributing an output of a unit for transmission of the error correction code data, the information on the call connection processing, and the information on the reception status report may be transmitted through the different transmission paths.

Further, as in the third embodiment, in addition to the first through Nth encoded data in the present embodiment, encoded data including the Intra-frame encoded data and the error correction code data may be of course distributed.

Respective functions and processing of the call connection processing unit 1302, transmission management unit 1303, data read unit 1304, first through Nth transmission units 1305 through 1307, report receiving unit 1308, and FEC data transmission unit 1309 in the content distribution device 1301 may be of course implemented by program control executed by a computer constituting the content distribution device 1301. Respective functions and processing of the call connection processing unit 1312, first through Nth receiving units 1313 through 1315, encoded data reconstruction unit 1316, decoder 1317, report transmission unit 1318, and FEC data receiving unit 1319 in the content receiving apparatus 1311 may be of course implemented by program control implemented by a computer constituting the content receiving unit 1311.

Figure 22:
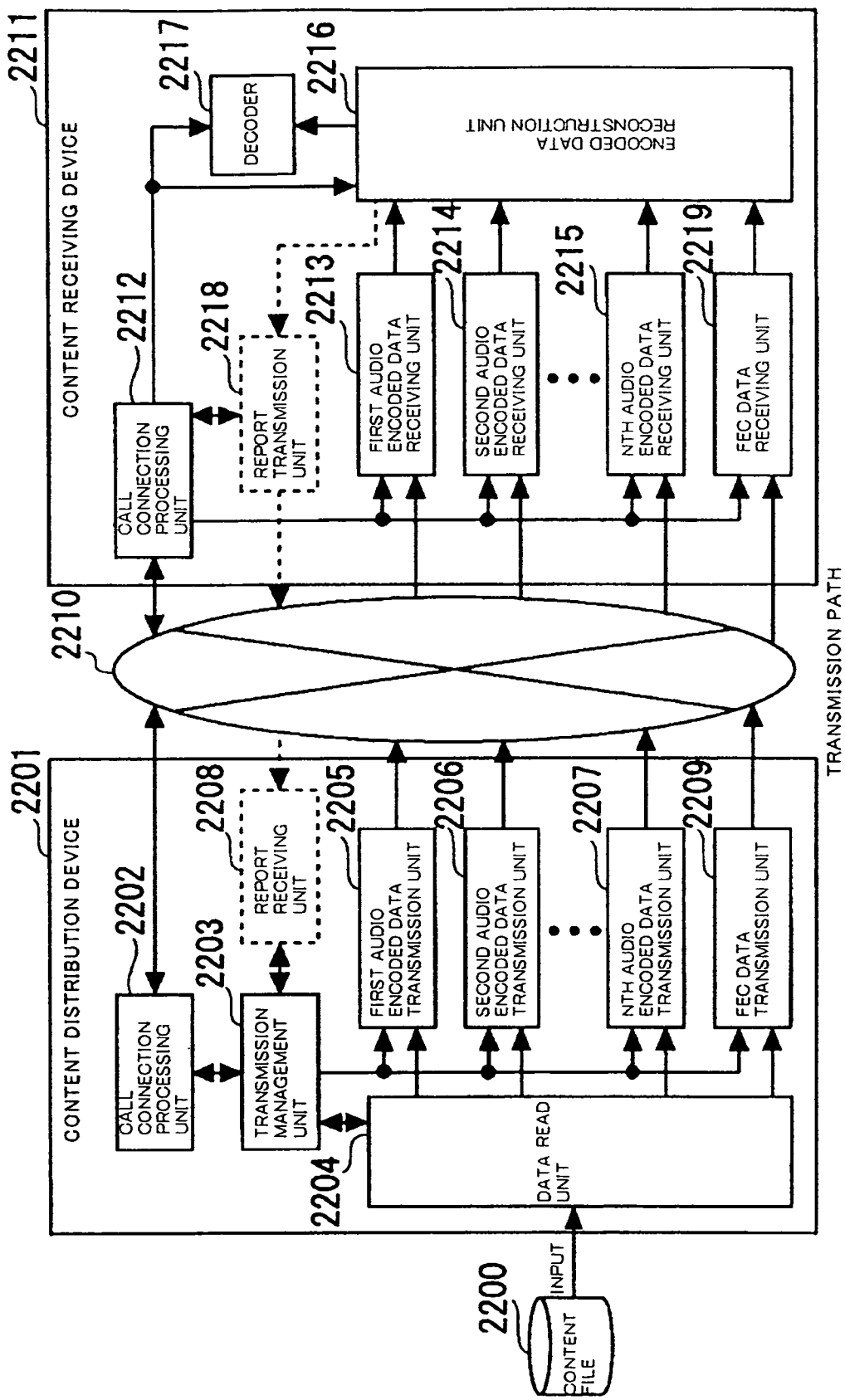
FIG. 22 is a diagram showing a variation example of the system configuration in the fifth embodiment of the present invention.
Figure 23:
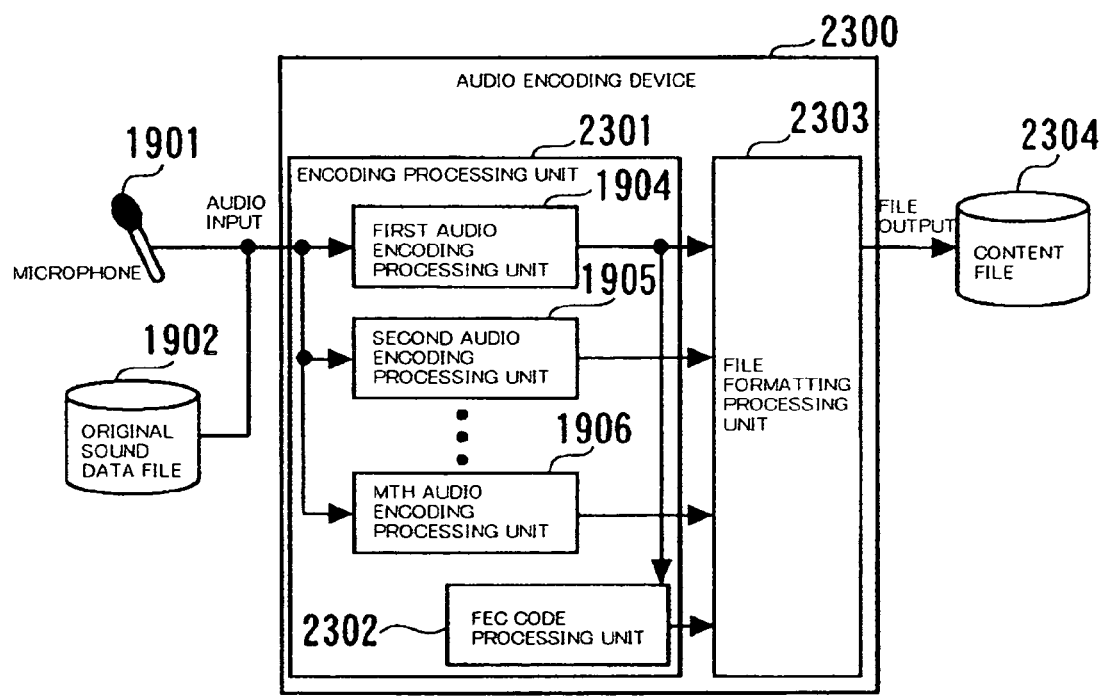
FIG. 23 is a diagram showing the configuration of an audio encoding device for creating a content file in FIG. 22.
Figure 24:
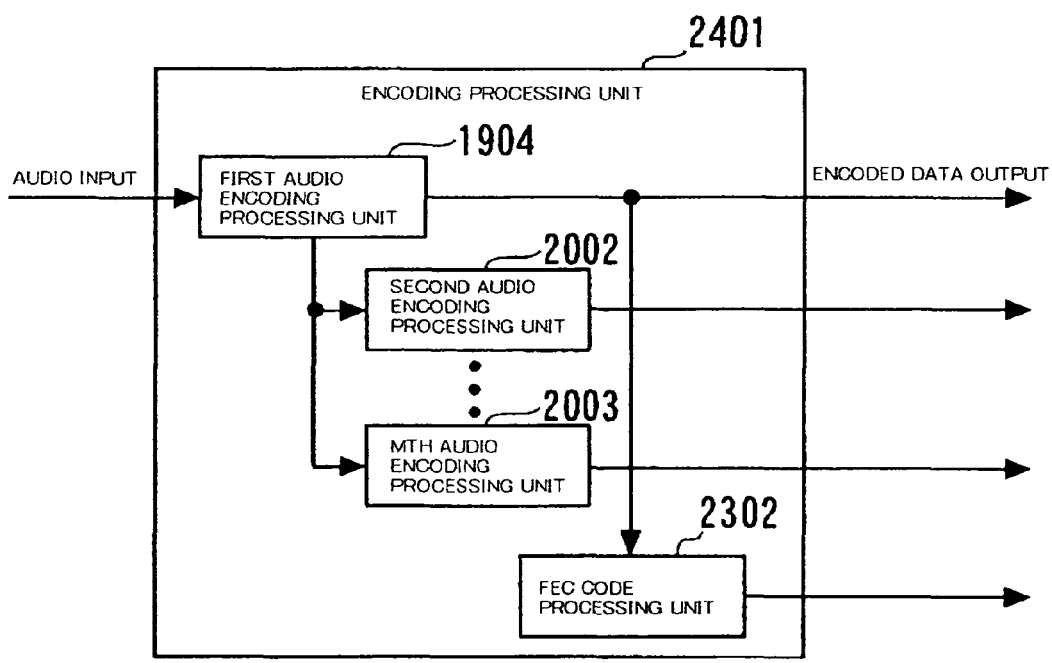
FIG. 24 is a diagram showing an example of a configuration of an encoding processing unit in FIG. 22.

In the present embodiment described above, by performing the same processing on audio encoded data as well, as shown in FIGS. 22 through 24, the same operation and effect can be obtained. Referring to FIG. 22, a content distribution device 2201 for distributing an audio signal includes a data read unit 2204 for reading audio data and FEC data from a content file 2200, first through Nth audio encoded data transmission units 2205 through 2207 for encoding the audio data read by the data read unit 2204, an FEC data transmission unit 2209 for transmitting the FEC data read by the data read unit 2204, a call connection processing unit 2202, a transmission management unit 2203, and a report receiving unit 2208. A content receiving unit 2211 includes first through Nth audio encoded data receiving units 2213 through 2215, an FEC data receiving unit 2219, an encoded data reconstruction unit 2216, a decoder 2217, a call connection processing unit 2212, and a report transmission unit 2218.

In an audio encoding device, the camera 201 and the video data file 202 shown in FIG. 14 is replaced by the microphone 1901 and the original sound data file 1902 in FIG. 23, respectively. Referring to FIG. 23, an audio encoding device 2300 includes the first through Mth audio encoding processing units 1904 through 1906 for respectively inputting an audio signal from the microphone 1901 or the original sound data file 1902, for encoding, an encoding processing unit 2301 including an FEC code processing unit 2302 for generating FEC data from encoded data from the first audio encoding processing unit 1904, and a file formatting processing unit 2303. Encoded data from the first through Mth audio encoding processing units 1904 through 1906 and the FEC code processing unit 2302 are output to a content file 2304 as independent tracks, respectively. Referring to FIG. 24, an encoding processing unit 2401 (2301 in FIG. 23) includes the first audio encoding processing unit 1904, second through Mth audio encoding processing units 2002 through 2003 that use a result of processing (encoding parameter) at the first audio encoding processing unit 1904, for outputting encoded data, and the FEC code processing unit 2302 for outputting FEC encoded data from encoded data from the first audio encoding processing unit 1904. An encoding unit for audio encoded data is data on input audio in a same time period. By sampling this at a same sampling frequency, and performing quantization at the same quantization bit number, for encoding, the encoding units having different compression rates can be thereby replaced with each other.

Further, when the content file includes both image encoded data and audio encoded data, and error correction code data, and when the content distribution device and the content receiving apparatus each include a function of processing both the image encoded data and the audio encoded data, an effect for both image and sound, shown in the present embodiment can be of course obtained.

Sixth Embodiment Mode of the Invention

In a sixth embodiment mode of the present invention, a transmission side includes means for reading at least one item of encoded data and at least one item of error correction code data from a content file with M encoded data having different compression rates stored therein, first through Nth encoded data processing means, at least one item of error correction code data processing means, and means for multiplexing outputs of the first through Nth encoded data processing means and the error correction code data processing means, wherein M and N are integers equal to or greater than one. The transmission side transmits the multiplexed data using at least one session. A reception side includes means for receiving the multiplexed data from the at least one session. The reception side extracts the encoded data received with no transmission error or no dropout. When the transmission error or the dropout is present, the data is restored using the error correction code data, and the encoded data is reconstructed, for decoding.

Sixth Embodiment

Next, a sixth embodiment of the present invention will be described with reference to drawings.

Figure 16:
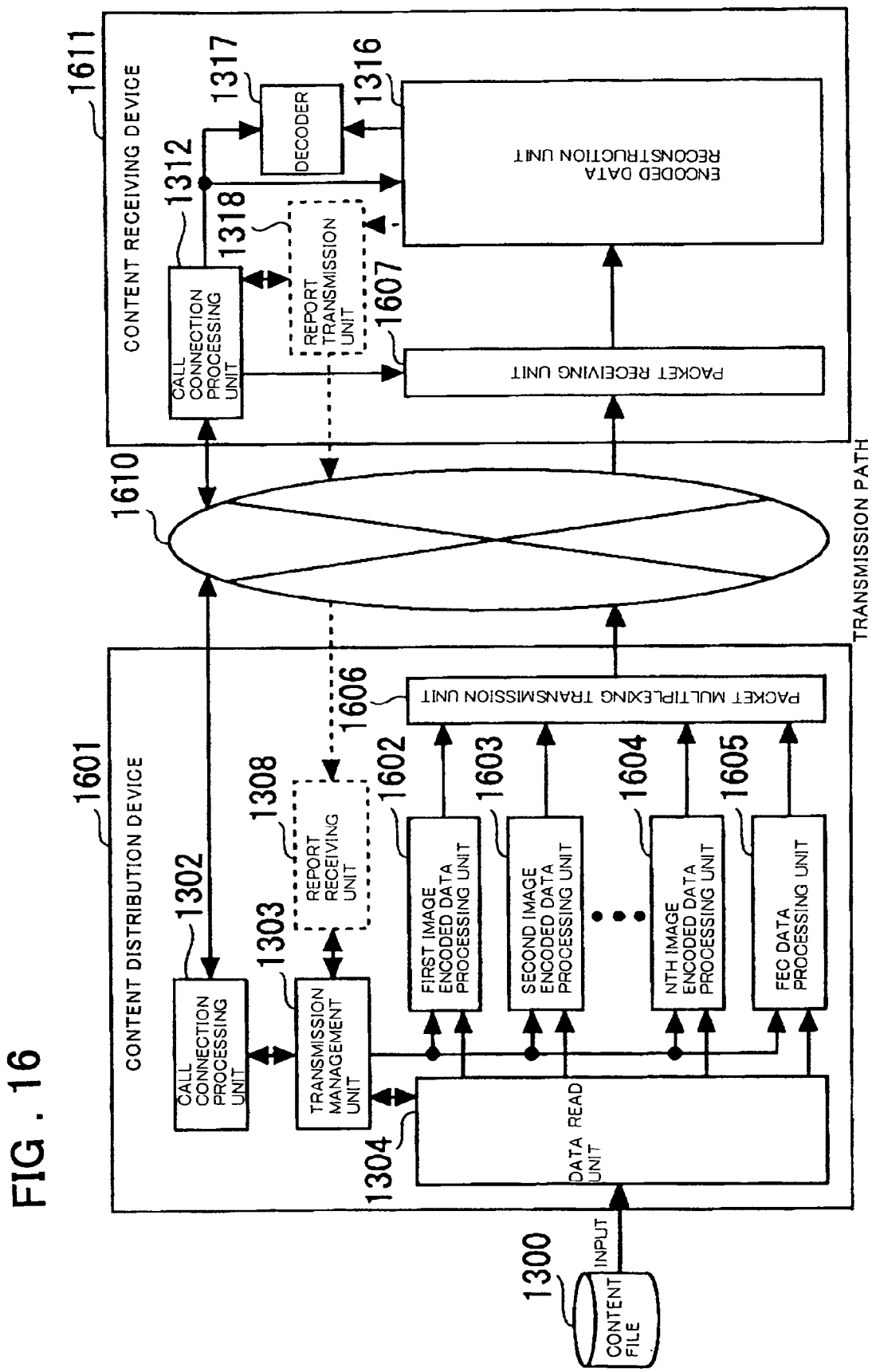
FIG. 16 is a diagram showing a system configuration in the sixth embodiment of the present invention.

FIG. 16 shows a configuration in the sixth embodiment of the present invention. A content distribution device 1601, a content receiving apparatus 1611, and a transmission path 1610 in FIG. 16 correspond to the content distribution device 1301, content receiving apparatus 1311, and transmission path 1310 in FIG. 13 showing the fifth embodiment, respectively. Thereafter, only portions different from those in the fifth embodiment will be described. Not only the error correction code data but also the Intra-frame encoded data may be distributed, as shown in the fifth embodiment.

First through Nth image encoded data processing units 1602 through 1604 and an FEC data processing unit 1605 in the content distribution device 1601 have the same structure as the encoded data processing unit 700 in FIG. 7, as in the second and fourth embodiments.

A packet multiplexing transmission unit 1606 multiplexes outputs (packets) of the first through Nth image encoded data processing units 1602 through 1604 and the FEC data processing unit 1605, and transmits image encoded data to the content receiving apparatus 1611 through the transmission path 1610 in one session.

A packet receiving unit 1607 in the content receiving apparatus 1611 receives a packet of the image encoded data from the content distribution device 1601. The packet receiving unit 1607 checks whether the packet is influenced by a data error in the course of transmission according to the checksum of the UDP header or the information corresponding thereto. In case the error occurs, the packet receiving unit 1607 discards the packet. In case the error does not occur, the packet receiving unit 1607 outputs the received packet to the encoded data reconstruction unit 1316.

Except for this, the elements are the same as corresponding respective elements in the fifth embodiment described before.

In the present embodiment, the outputs of the first through Nth encoded data processing units and the FEC data processing unit are multiplexed, for transmission and reception. An arbitrary combination of the outputs of these processing units can also be multiplexed, for transmission and reception.

Figure 17:
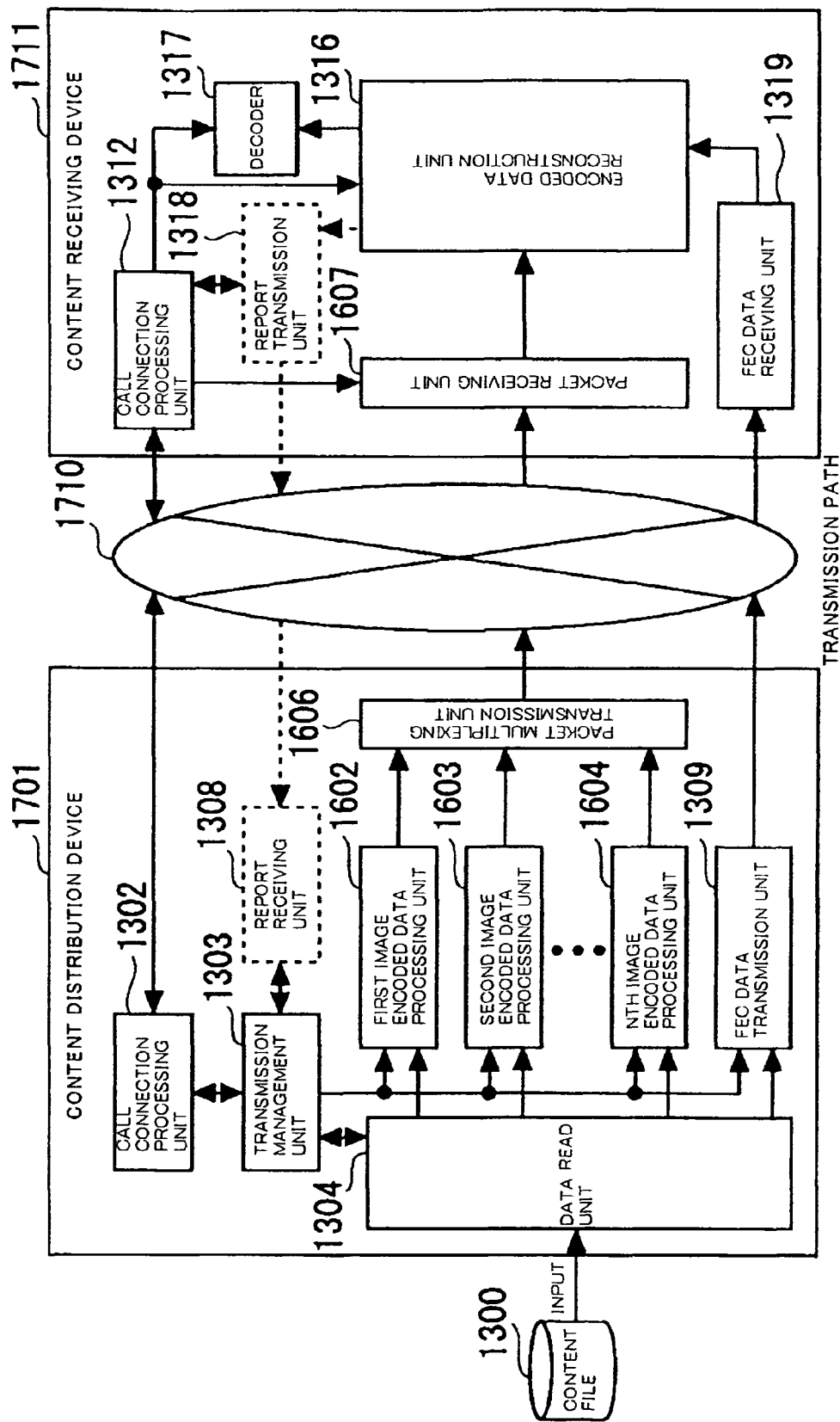
FIG. 17 is a diagram showing a variation example of the system configuration in the sixth embodiment of the present invention.

In the present embodiment, the packet multiplexing transmission unit and the packet receiving unit were described to be individual units, respectively. However, even if a plurality of these units are present, the same effect can be obtained. Further, even if a plurality of transmitting and receiving units for transmitting and receiving a packet in an independent session, respectively, is present, the same operation and effect can be obtained. An example of a configuration in which the outputs of the first through Nth image encoded data processing units are multiplexed for transmission and reception, and error corrected code data is transmitted and received in a session other than that, for example, becomes the one as shown in FIG. 17. In this case, a content distributing side can of course control quality and stability of content to be reproduced for each content receiving apparatus according to control over session information to be notified in call connection processing, as in the fifth embodiment. Further, for each session for distribution, selection among the multicast, broadcast, or unicast can be of course made. In this case, a content receiving apparatus 1711 can of course control the number of sessions to be received by power that can be utilized by the content receiving apparatus 1711.

Meanwhile, a plurality of the transmission paths may be used, and sessions for distributing multiplexed first through Nth encoded data and the error correction code data, the information on the call connection processing, the information on the reception status report may be transmitted through the different transmission paths.

Further, as described in the fourth embodiment described before, in addition to the first through Nth encoded data in the present embodiment, the encoded data including the Intraframe encoded data and the error correction code data may be of course multiplexed, for distribution.

Respective functions and processing of the call connection unit 1302, transmission management unit 1303, data read unit (data read/generation/conversion unit) 1304, first through Nth image encoded data processing units 1602 through 1604, FEC data processing unit 1605, packet multiplexing transmission unit 1606, and report receiving unit 1308 of the content distribution device 1601 may be implemented by program control to be executed by a computer constituting the content distribution device 1601. Respective functions and processing of the call connection processing unit 1312, encoded data reconstruction unit 1316, decoder 1317, report transmission unit 1318, packet receiving unit 1607 of the content receiving apparatus 1611 may be of course implemented by the program control implemented by a computer constituting the content receiving unit 1611.

Respective functions and processing of the call connection unit 1302, transmission management unit 1303, data read unit 1304, first through Nth image encoded data processing units 1602 through 1604, FEC data transmission unit 1309, packet multiplexing transmission unit 1606, and report receiving unit 1308 of content distribution device 1701 may be implemented by program control to be executed by a computer constituting the content distribution device 1701. Respective functions and processing of the call connection processing unit 1312, encoded data reconstruction unit 1316, decoder 1317, report transmission unit 1318, FEC data receiving unit 1319, and packet receiving unit 1607 of the content receiving apparatus 1711 may be of course implemented by program control implemented by a computer constituting the content receiving unit 1711.

Figure 25:
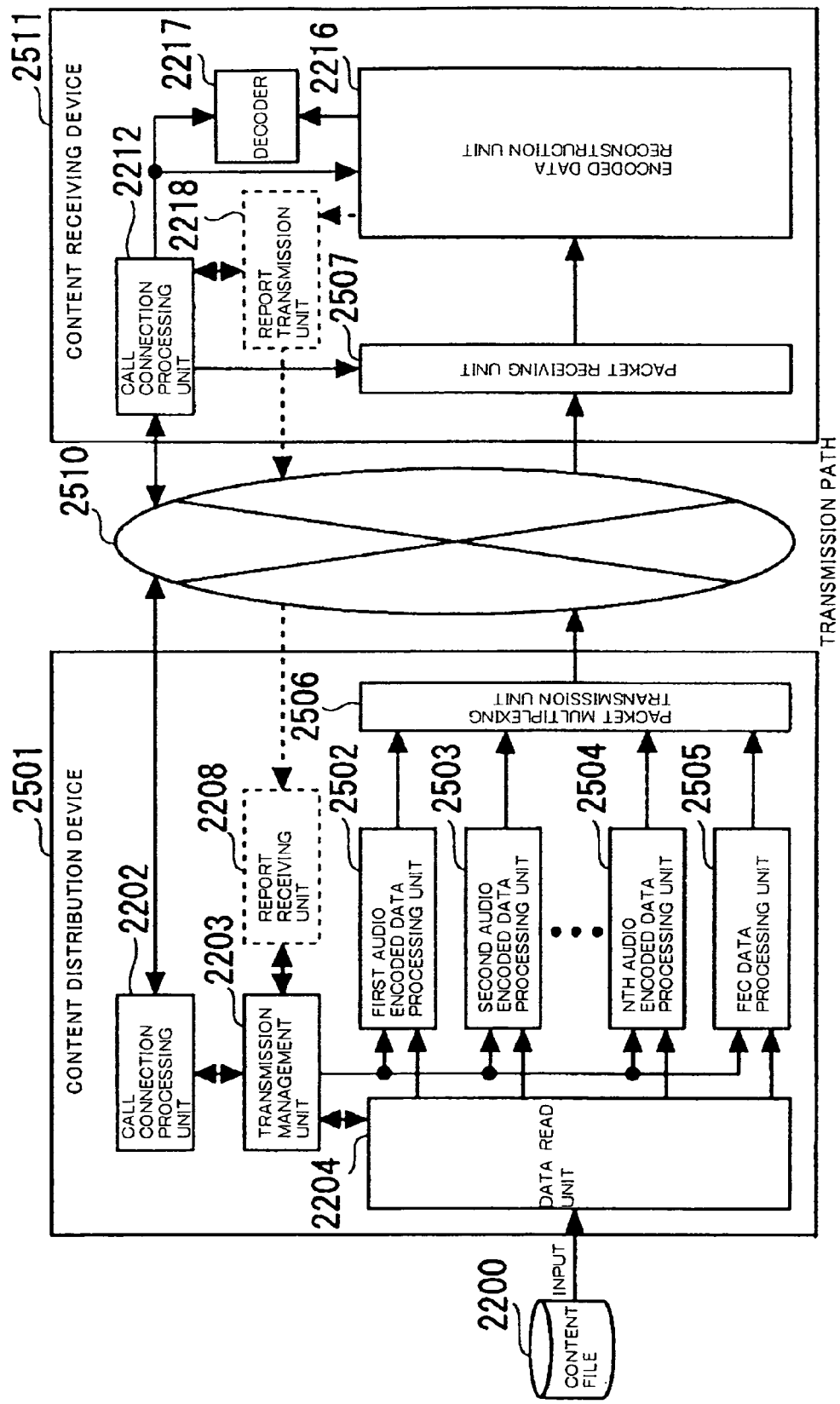
FIG. 25 is a diagram showing a variation example of the configuration in the sixth embodiment of the present invention.
Figure 26:
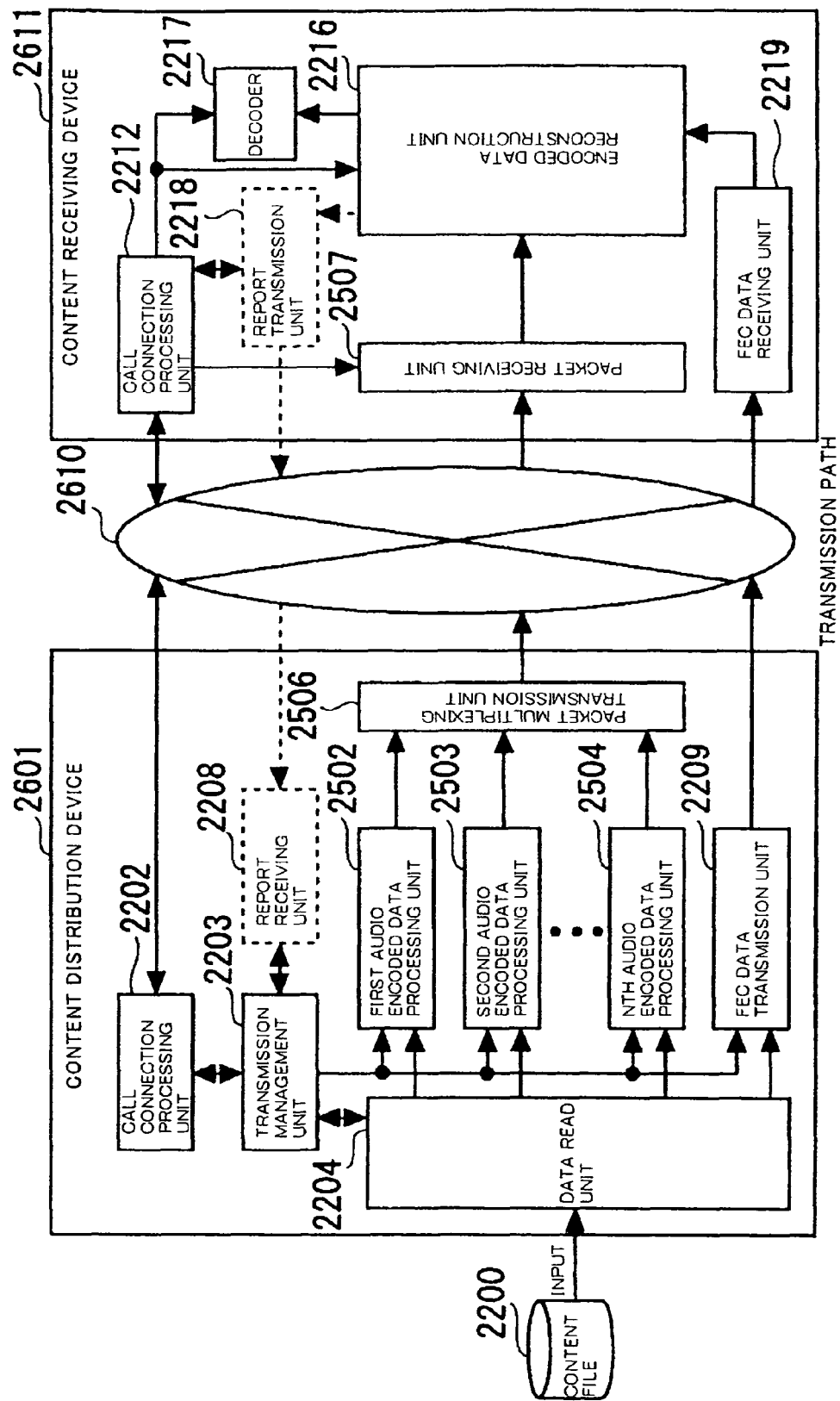
FIG. 26 is a diagram showing a variation example of the system configuration in FIG. 25.

In the present embodiment described above, by performing the same processing on audio encoded data as well, as shown in FIGS. 25 through 26, the same operation and effect can be obtained. Referring to FIG. 25, a content distribution device 2501 for distributing an audio signal includes the data read unit 2204 for reading audio data and FEC data from the content file 2200, first through Nth audio encoded data transmission units 2502 through 2504 for encoding the audio data read by the data read unit 2204, an FEC data processing unit 2505 for processing the FEC data read by the data read unit 2204, 2504, and a packet multiplexing transmission unit 2506 for multiplexing outputs of the first through Nth audio encoded data processing units 2502 through 2504 and the FEC data processing unit 2505 into a packet, for output. A content receiving unit 2511 includes a packet receiving unit 2507, the encoded data reconstruction unit 2216, the decoder 2217, the call connection processing unit 2212, and the report transmission unit 2218. A configuration shown in FIG. 26 is a variation of a configuration in FIG. 25, and corresponds to an audio encoded data distribution system for image encoded data distribution in FIG. 17. An example shown in FIG. 26 has a configuration in which the packet multiplexing transmission unit 2506 multiplexes outputs of the first through Nth audio encoded data processing units 2502 through 2504, for output to a transmission path 2610, and FEC data is not multiplexed into audio encoded data and is individually transmitted to the transmission path 2610 by the FEC data transmission unit 2209. A content receiving apparatus 2611 includes the packet receiving unit 2507 for receiving the multiplexed encoded data and the FEC data receiving unit 2219 for receiving the FEC data. The encoded data is reconstructed by the encoded data reconstruction unit 2216.

Further, when the content file includes both image encoded data and audio encoded data, and when the content distribution device and the content receiving data each include a function of processing both of the image encoded data and the audio encoded data, an effect for both image and sound, shown in the present embodiment can be of course obtained.

The above description was given in connection with the embodiments described above. The present invention, however, is not limited to configurations of the embodiments described above, and of course includes various variations and modifications that could be made by those skilled in the art within the scope of the present invention.

What is claimed is:

1. A content receiving apparatus comprising:

means for receiving encoded data and error correction code data, from at least one session and identifying individual ones of the encoded data and the error correction code data therefrom, the encoded data and error correction code data being transmitted from a content distribution apparatus comprising:

means for reading at least one item of encoded data and at least one item of error correction code data from a content file;

first through Nth encoded data processing means for receiving the read encoded data and outputting first through Nth encoded data, wherein N is an integer equal to or greater than one;

at least one error correction code data processing means for receiving the read error correction code data and outputting the error correction code data;

first call connection processing means for controlling call connection between the content distribution apparatus and the content receiving apparatus; and means for multiplexing data from at least two out of the first through Nth encoded data processing means, for transmission of at least one of (a) at least a part of the first through Nth encoded data; and (b) at least a part of the error correction code data, wherein the content file is created by a content encoding apparatus comprising:

means for encoding an input signal or an input data file at mutually different compression rates, respectively;

means for generating at least one item of error correction code data from at least one of said first through Mth encoded data, wherein M is an integer equal to or greater than one; and means for writing the encoded data and the error correction code data, with a preset time difference or with interleaving, into a file as independent tracks, respectively, the content receiving apparatus further comprising:
means for extracting the encoded data received with no transmission error and no dropout from among the received data and for restoring the encoded data using the error correction code data when the transmission error or the dropout is present to reconstruct the encoded data;
second call connection processing means for controlling call connection between the content receiving apparatus and the content distribution apparatus, the second call connection processing means exchanging at least a port number for transmission of a reception status report with the first call connection processing means of the content distribution apparatus; and
means for selecting whether to receive the error correction code data when receiving at least two of the error correction code data or the error correction code data used in error correction processing, based on at least one of:
error/loss rate of received data;
error/loss state of data on a transmission path;
error correction encoding scheme;
available power; and
setting set in advance.

2. The content receiving apparatus defined in claim 1, further including:
means for receiving at least one of the multiplexed encoded data and the error correction code data from at least one session and identifying individual ones of the encoded data therefrom.

3. The content receiving apparatus defined in claim 1, including:
means for restoring the encoded data using at least one of:
an encryption key obtained by call connection processing when the encoded data is encrypted;
a distributed encryption key; and
a predetermined encryption key.

4. The content receiving apparatus defined in claim 1, further comprising:
means for selecting whether to receive the data by at least one of the encoded data receiving means based on at least one of:
error/loss rate of received data;
available power; and
setting set in advance.

5. The content receiving apparatus defined in claim 1, wherein the means for reconstructing the encoded data determines whether the encoded data is duplicated or not based on an identification number assigned to a transmitting unit of the encoded data.

6. The content receiving apparatus defined in claim 1, wherein the means for reconstructing the encoded data comprises means for determining at least one of a compression rate and a data type of the encoded data using at least one of:
(a) a predetermined distribution data receiving session;
(b) predetermined data identification information assigned to the transmitting unit of the data;
(c) a distribution data receiving session, notified by the call connection processing; and
(d) data identification information assigned to the transmitting unit of the data and notified by the call connection processing.

7. The content receiving apparatus defined in claim 1, wherein a unit of the encoded data transmitted by interleaving the unit or providing a time difference for the unit can is received, and a buffer size determined by at least one of:
(a) a predetermined receive buffer size;
(b) a buffer size notified by the call connection processing;
(c) a buffer size calculated based on a predetermined content distribution rate and information on a time difference or interleave setting; and
(d) a buffer size calculated based on a content distribution rate notified by the call connection processing and the information on the time difference or interleave setting;
is secured so that the encoded data can be reconstructed.

8. The content receiving apparatus defined in claim 1, comprising:
means for transmitting a reception status of distributed data to a content distribution apparatus.

9. A content receiving apparatus comprising:
means for receiving encoded data and error correction code data, from at least one session and identifying individual ones of the encoded data and the error correction code data therefrom, the encoded data and error correction code data being transmitted from a content distribution apparatus comprising:
means for reading at least one item of encoded data from a content file; and
first through Nth encoded data processing means for receiving the read encoded data and outputting first through Nth encoded data, wherein N is an integer equal to or greater than two;
first call connection processing means for controlling call connection between the content distribution apparatus and the content receiving apparatus;
means for multiplexing data from at least two out of the first through Nth encoded data processing means, for transmission of at least one of
(a) at least a part of the first through Nth encoded data; and
(b) at least a part of the error correction code data, being transmitted with time difference or interleaving,
wherein the content file is created by a content encoding apparatus comprising:
means for encoding an input signal or an input data file at mutually different compression rates, respectively;
means for generating at least one item of error correction code data from at least one of said first through Mth encoded data, wherein M is an integer equal to or greater than one; and
means for writing the encoded data and the error correction code data, with a preset time difference or with interleaving, into a file as independent tracks, respectively,
the content receiving apparatus further comprising:
means for extracting the encoded data received with no transmission error and no dropout from among the received data and for restoring the encoded data using the error correction code data when the transmission error or the dropout is present to reconstruct the encoded data,
second call connection processing means for controlling call connection between the content receiving apparatus and the content distribution apparatus, the second call connection processing means exchanging at least a port number for transmission of a reception status report with the first call connection processing means of the content distribution apparatus; and
means for selecting whether to receive the error correction code data when receiving at least two of the error correction code data or the error correction code data used in error correction processing, based on at least one of:
error/loss rate of received data;
error/loss state of data on a transmission path;
error correction encoding scheme;
available power; and
setting set in advance.

* * * * *

UNITED STATES PATENT AND TRADEMARK OFFICE
CERTIFICATE OF CORRECTION

PATENT NO.      : 8,503,538 B2                                Page 1 of 1
APPLICATION NO. : 10/587752
DATED           : August 6, 2013
INVENTOR(S)     : Dei et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1672 days.

Signed and Sealed this

Fifteenth Day of September, 2015

Michelle K. Lee
*Director of the United States Patent and Trademark Office*